US008687937B2

(12) United States Patent
Tsao et al.

(10) Patent No.: US 8,687,937 B2
(45) Date of Patent: Apr. 1, 2014

(54) LIGHT-GUIDE MODULE

(75) Inventors: Ming-Sen Tsao, Taichung (TW);
Kuo-Wen Chang, Taichung (TW)

(73) Assignee: Genius Electronic Optical Co., Ltd.,
Taichung (TW)

( * ) Notice: Subject to any disclaimer, the term of this patent is extended or adjusted under 35 U.S.C. 154(b) by 256 days.

(21) Appl. No.: 13/104,344

(22) Filed: May 10, 2011

(65) Prior Publication Data

US 2012/0128298 A1      May 24, 2012

(30) Foreign Application Priority Data

Nov. 23, 2010   (TW) .............................. 99140388 A
Jan. 14, 2011   (TW) .............................. 100101429 A

(51) Int. Cl.
*G02B 6/10*      (2006.01)
*G02B 5/02*      (2006.01)

(52) U.S. Cl.
USPC ............ 385/146; 385/901; 362/558; 362/610

(58) Field of Classification Search
USPC .......... 385/133, 146, 901; 362/558, 560, 600,
362/602, 606, 609, 610, 615, 623
See application file for complete search history.

(56) References Cited

U.S. PATENT DOCUMENTS

| 4,985,809 | A  | * | 1/1991  | Matsui et al. ................. 362/624 |
| 5,178,447 | A  | * | 1/1993  | Murase et al. ................ 362/621 |
| 5,499,112 | A  |   | 3/1996  | Kawai et al. |
| 5,921,651 | A  | * | 7/1999  | Ishikawa ....................... 362/624 |
| 6,412,968 | B1 | * | 7/2002  | Ohkawa ........................... 362/26 |
| 6,710,829 | B2 | * | 3/2004  | Liao ................................ 349/65 |
| 6,746,129 | B2 | * | 6/2004  | Ohkawa ........................ 362/625 |
| 6,783,254 | B2 | * | 8/2004  | Fujino et al. .................. 362/615 |
| 6,846,098 | B2 | * | 1/2005  | Bourdelais et al. ........... 362/330 |
| 6,979,112 | B2 | * | 12/2005 | Yu et al. ......................... 362/600 |
| 6,991,359 | B2 | * | 1/2006  | Leu et al. ....................... 362/624 |
| 7,048,427 | B2 | * | 5/2006  | Fujino et al. .................. 362/621 |
| 7,108,414 | B2 | * | 9/2006  | McCollum et al. ........... 362/604 |
| 7,125,151 | B2 | * | 10/2006 | Uemura et al. ............... 362/602 |
| 7,588,365 | B2 | * | 9/2009  | Katsumata .................... 362/623 |

(Continued)

FOREIGN PATENT DOCUMENTS

CN      101178506 A      5/2008
CN      101441354 A      5/2009

(Continued)

OTHER PUBLICATIONS

Chinese Search Report issued for CN 2011100457583, dated Jan. 9, 2013.

*Primary Examiner* — Daniel Petkovsek
(74) *Attorney, Agent, or Firm* — Dickstein Shapiro LLP

(57) ABSTRACT

A light-guide module includes a light-guide strip having opposite first and second ends, a light-entry surface disposed at the first end, a light-exit surface extending between the first and second ends, and first and second working surfaces disposed parallel to each other and extending between the first and second ends. One of the first and second working surfaces defines a light-scatter zone and includes a plurality of micro-scatter structures that are disposed within the light-scatter zone and that configure the light-scatter zone with a light-scattering ability that varies from the first end to the second end. The light-guide module also includes a reflecting element disposed to reflect light that exits from the light-guide strip via the first and second working surfaces back into the light-guide strip via the first and second working surfaces, respectively.

20 Claims, 20 Drawing Sheets

(56) References Cited

U.S. PATENT DOCUMENTS 7,650,056 B2 * 1/2010 Chen ............................ 385/146
8,047,698 B2 * 11/2011 Zhang et al. .................. 362/615
8,277,104 B2 * 10/2012 Jeong et al. ................... 362/601
8,525,950 B2 * 9/2013 Jung ............................. 349/66
8,591,090 B2 * 11/2013 Lin ............................... 362/619

2011/0199774 A1   8/2011   Shinohara

FOREIGN PATENT DOCUMENTS

| CN | 201434256 Y | 3/2010 |
| CN | 201589081 U | 9/2010 |
| WO | WO-2010044190 A1 | 4/2010 |

* cited by examiner

US 8,687,937 B2

LIGHT-GUIDE MODULE

CROSS-REFERENCE TO RELATED APPLICATIONS

This application claims priority of Taiwanese application no. 099140388, filed on Nov. 23, 2010 and Taiwanese application no. 100101429, filed on Jan. 14, 2011.

BACKGROUND OF THE INVENTION

1. Field of the Invention

The present invention relates to a light-guide module, more particularly to a light-guide module including a light-guide strip.

2. Description of the Related Art

U.S. Pat. Nos. 5,499,112 and 6,783,254 disclose light-guide strips applicable to scanner and facsimile devices. The light-guide strips serve to guide light passing therethrough onto a target surface to thereby illuminate the target surface with uniform illumination distribution. Shown in FIG. 1 is a light-guide strip 1 disposed such that an illuminating surface thereof is parallel to and faces toward a target surface 2, thereby directing light passing through the light-guide strip 1 and exiting via the illuminating surface onto the target surface 2. Shown in FIG. 2 is a plot of illumination distribution along the target surface 2. It is apparent that such a configuration of the light-guide strip 1 with respect to the target surface 2 may achieve uniform illumination of the target surface 2, whereby visible features (e.g., text and images) on the target surface 2 may be adequately illuminated for image acquisition or optical character recognition processes. The configuration, in which the light-guide strip 1 is disposed such that the illuminating surface thereof illuminates the target surface 2 from a predetermined angle with uniform illumination, may be referred to as "uniform illumination at a specific angle".

FIG. 3 illustrates a configuration in which first and second image-acquisition modules 3, 4 are disposed at specific positions with respect to the light-guide strip 1 such that light exiting via the illuminating surface of the light-guide strip 1 is directed toward the first and second image-acquisition modules 3, 4. However, referring to FIG. 4, which is a plot of relative brightness distribution along the illuminating surface of the light-guide strip 1, it is apparent that, in such a configuration, images captured by the image-acquisition modules 3, 4 have a non-uniform relative brightness distribution. This is because each of the first and second image-acquisition modules 3, 4 forms an angle with the light-guide strip 1 that varies along the illuminating surface, and each of the first and second image-acquisition modules 3, 4 is spaced apart from the light-guide strip 1 by a distance that varies along the illuminating surface. In addition, light exiting via the illuminating surface is not scattered and hence has high directivity. Therefore, images captured by the first and second image-acquisition modules 3, 4 in such a configuration will have a non-uniform relative brightness distribution. Accordingly, the light-guide strip 1 is not suitable for optical touch-control systems.

SUMMARY OF THE INVENTION

Therefore, an object of the present invention is to provide a light-guide module capable of achieving uniform relative brightness at multiple positions.

Accordingly, a light-guide module of the present invention includes:

a light-guide strip having opposite first and second ends, a light-entry surface disposed at the first end, a light-exit surface extending between the first and second ends, and first and second working surfaces disposed parallel to each other and extending between the first and second ends, one of the first and second working surfaces defining a light-scatter zone and including a plurality of micro-scatter structures that are disposed within the light-scatter zone and that configure the light-scatter zone with a light-scattering ability that varies from the first end to the second end; and a reflecting element disposed to reflect light that exits from the light-guide strip via the first and second working surfaces back into the light-guide strip via the first and second working surfaces, respectively.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
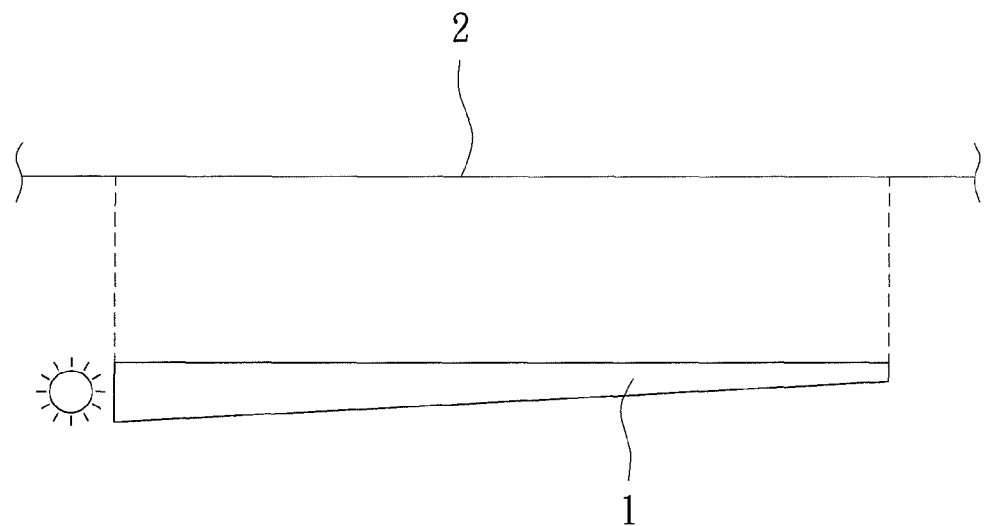
FIG. 1 is a schematic diagram to illustrate a conventional light-guide strip and a target surface.
Figure 2:
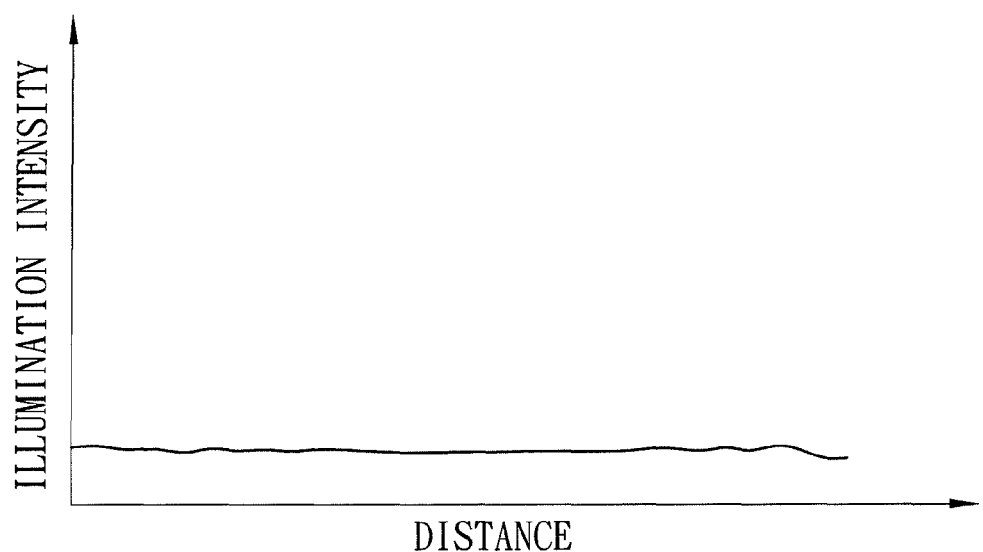
FIG. 2 is a plot of illumination distribution along the target surface.
Figure 3:
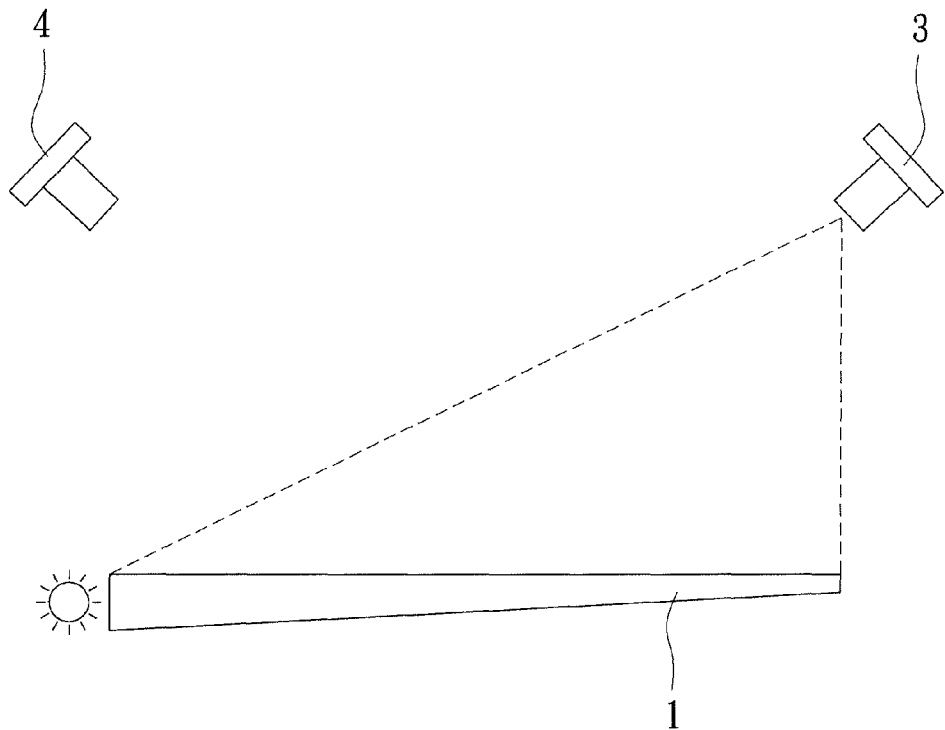
FIG. 3 is a schematic diagram to illustrate the conventional light-guide strip and first and second image-acquisition modules.
Figure 4:
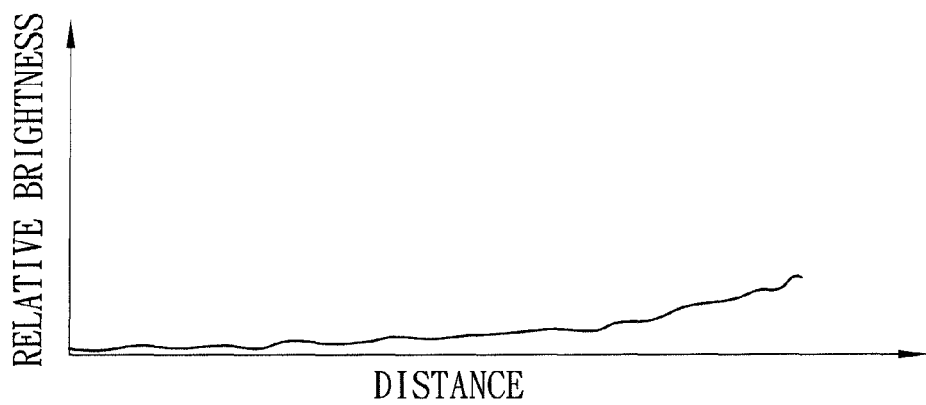
FIG. 4 is a plot of relative brightness distribution of images captured by one of the image-acquisition modules.

Before the present invention is described in greater detail, it should be noted that like elements are denoted by the same reference numerals throughout the disclosure.

Figure 5:
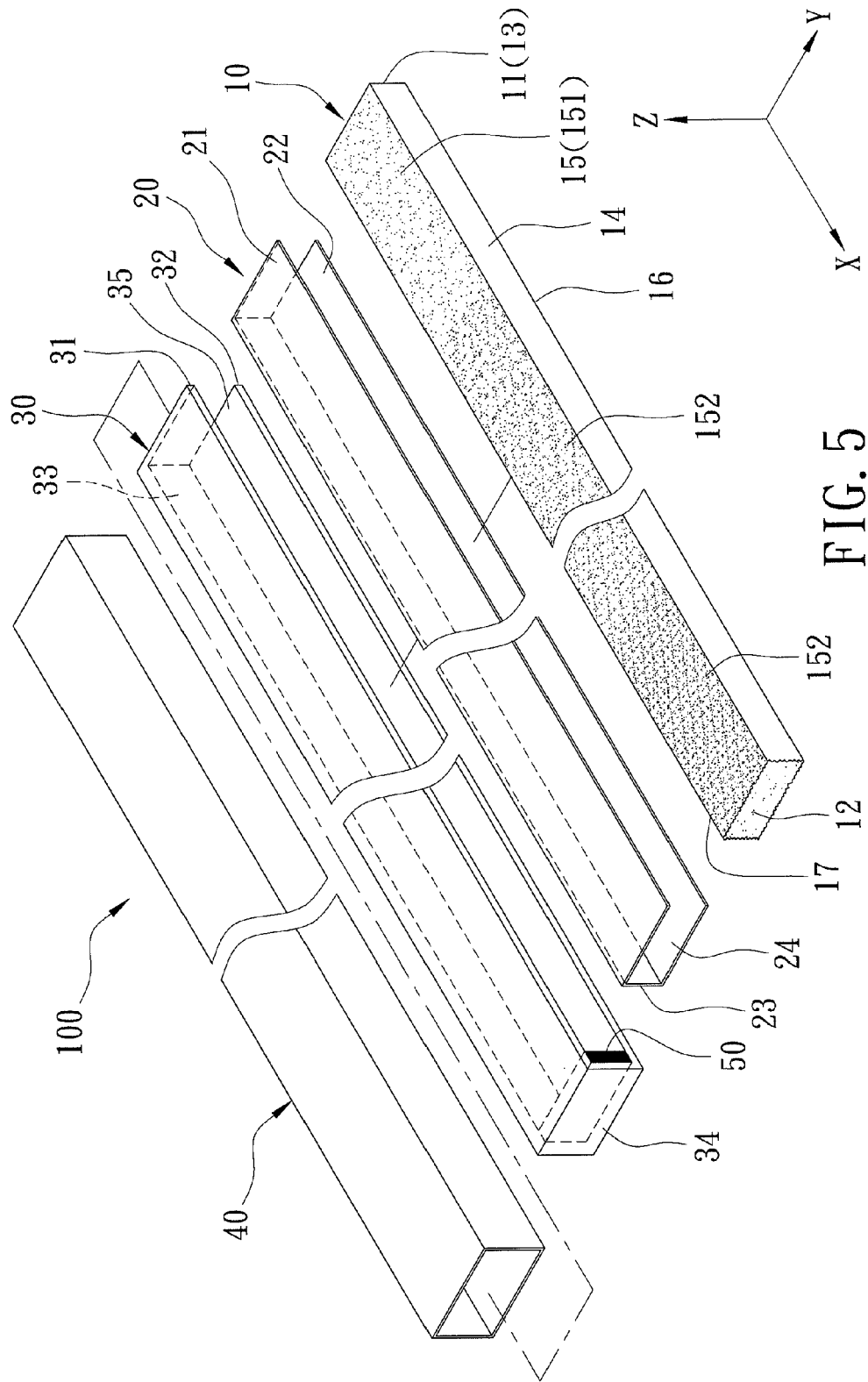
FIG. 5 is an exploded perspective view of the first preferred embodiment of a light-guide module including a light-guide strip according to the present invention.
Figure 5A:
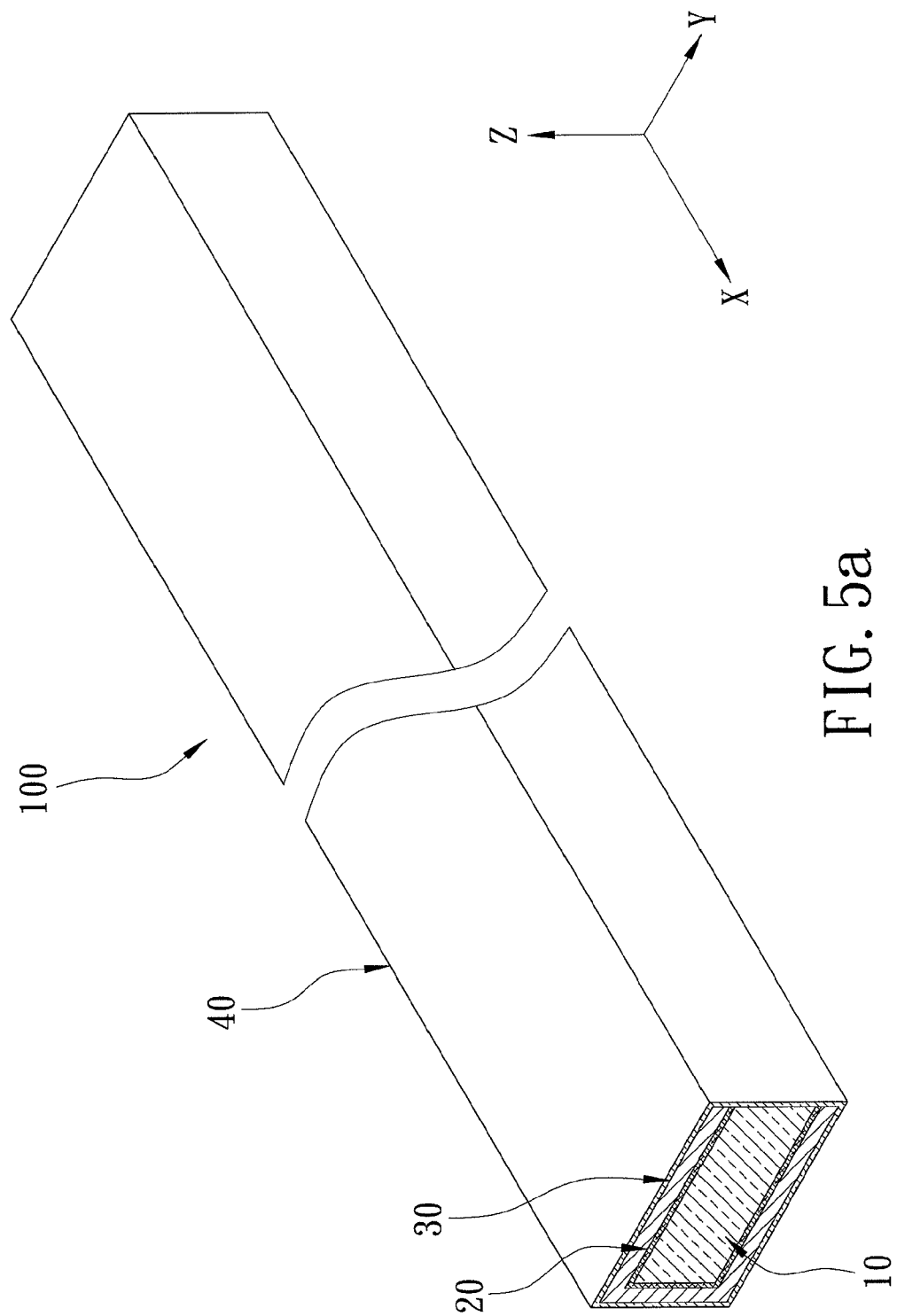
FIG. 5a is an assembled perspective view of the light-guide module of the first preferred embodiment.
Figure 6:
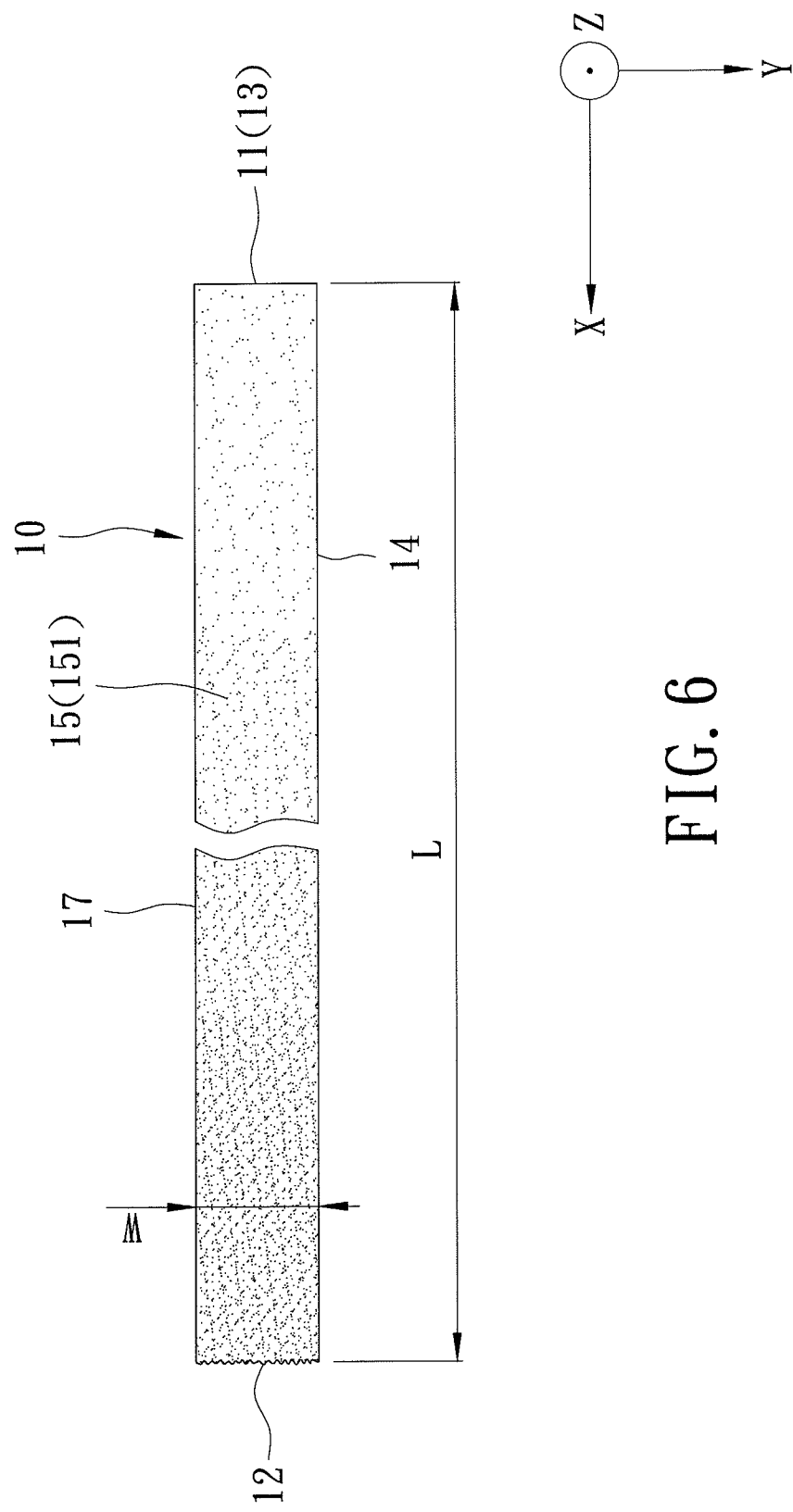
FIG. 6 is a schematic diagram to illustrate the light-guide strip of the first preferred embodiment.
Figure 7:
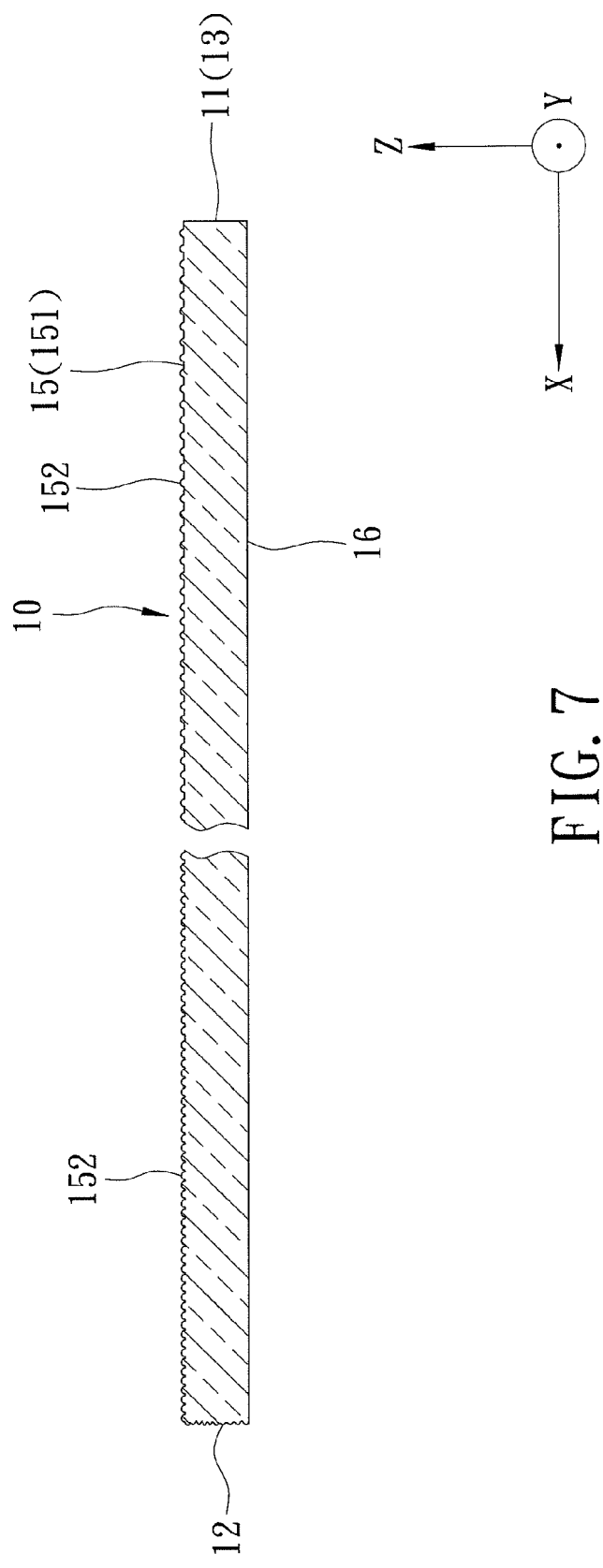
FIG. 7 is a fragmentary schematic sectional diagram of the light-guide strip.

Referring to FIGS. 5 to 7, the first preferred embodiment of a light-guide module 100 according to this invention includes a light-guide strip 10, a reflecting element 20, a housing 30, a diffuser 40, and a light-extinguishing element 50.

The light-guide strip 10 includes: a first end 11; a second end 12 opposite to the first end 11; a light-entry surface 13 disposed at the first end 11; a light-exit surface 14 extending in a first direction (X) and extending between the first and second ends 11, 12; first and second working surfaces 15, 16 disposed parallel to each other, extending in the first direction (X), and extending between the first and second ends 11, 12; and a rear surface 17 disposed opposite to the light-exit surface 14, extending in the first direction (X), and extending between the first and second ends 11, 12.

In the present embodiment, the light-guide strip 10 has a length (L) of 475 mm along the first direction (X), the first working surface 15 has a width of 4 mm, the light-exit surface 14 has a height of 1.6 mm, and the light-guide strip 10 resembles a board having a rectangular cross-section. In other words, the light-guide strip 10 has cross-sectional dimensions that are non-varying along the first direction (X).

In the present embodiment, the light-entry surface 13 is a polished surface for achieving total reflection of light and reducing light leakage. The second end 12 is formed with a roughened surface through which a major portion of light may be directly refracted to exit the light-guide strip 10, thereby preventing excessive light from exiting through a portion of the light-exit surface 14 proximate to the second end 12.

Since the rear surface 17 is disposed parallel and opposite to the light-exit surface 14, and the first and second working surfaces 15, 16 are disposed parallel and opposite to each other and disposed perpendicular to the light-exit surface 14 and the rear surface 17, the light-exit surface 14 has a substantially rectangular profile when viewed from a second direction (Y) that is perpendicular to the first direction (X).

The first working surface 15 has a substantially rectangular profile when viewed from a third direction (Z) that is perpendicular to the first and second directions (X, Y), and has a length-width ratio not smaller than 50. In the present embodiment, the length-width ratio is 475/4≈119. The first working surface 15 defines a light-scatter zone 151 having a width (W) in the second direction (Y) that is non-varying along the first direction (X), and a plurality of micro-scatter structures 152. That is to say, the light-scatter zone 151 is also rectangular. The light-scatter zone 151 preferably occupies the entire length of the first working surface 15.

Figure 8:
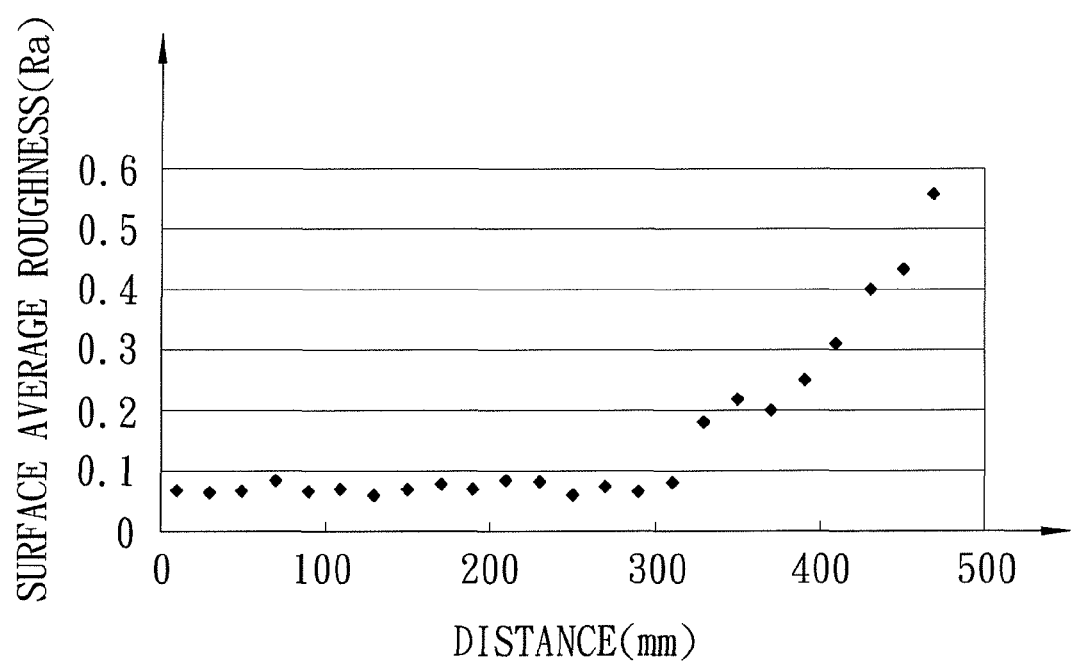
FIG. 8 is a plot of surface average roughness of a light-scatter zone defined by a first working surface of the light-guide strip at different distances from a first end of the light-guide strip toward a second end of the same.

In this embodiment, the first working surface 15 is formed with a plurality of irregular protrusions within the light-scatter zone 151, the irregular protrusions serving as the micro-scatter structures 152. Referring to FIG. 7, since the irregular protrusions have a distribution density that varies along the first direction (X), the light-scatter zone 151 has a surface average roughness "Ra" that varies along the first direction (X). Referring to Table 1 below and FIG. 8, in this embodiment, the surface average roughness "Ra" increases along the first direction (X) from the first end 11 toward the second end 12. It is to be noted that "d" represents a distance in millimeters from the first end 11 toward the second end 12.

TABLE 1

| d(mm) | 10 | 30 | 50 | 70 | 90 | 110 | 130 | 150 |
|---|---|---|---|---|---|---|---|---|
| Ra | 0.067 | 0.062 | 0.068 | 0.083 | 0.067 | 0.07 | 0.061 | 0.07 |
| d(mm) | 170 | 190 | 210 | 230 | 250 | 270 | 290 | 310 |
| Ra | 0.076 | 0.07 | 0.084 | 0.079 | 0.06 | 0.074 | 0.063 | 0.079 |
| d(mm) | 330 | 350 | 370 | 390 | 410 | 430 | 450 | 470 |
| Ra | 0.18 | 0.215 | 0.199 | 0.25 | 0.311 | 0.399 | 0.434 | 0.558 |

The roughness at distances of 25% (118.75 mm), 75% (356.25 mm), and 95% (451.25 mm) of the length (L) from the first end 11 toward the second end 12 may be represented by Ra(0.25L), Ra(0.75L), and Ra(0.95L), respectively.

In this embodiment, the light-guide strip 10 satisfies the conditions of:

$$Ra(0.75L)/Ra(0.25L) \geq 2 \quad (1)$$

$$Ra(0.95L)/Ra(0.25L) \geq 5 \quad (2)$$

Since the length (L) of the light-guide strip 10 is 475 mm:

$$Ra(0.75L)/Ra(0.25L) = 0.215/0.07 = 3.07 \geq 2$$

$$Ra(0.95L)/Ra(0.25L) = 0.434/0.07 = 6.2 \geq 5$$

Since the micro-scatter structures 152 are formed by the irregular protrusions with a distribution density that increases from the first end 11 toward the second end 12, and since the distribution density of the irregular protrusions have a positive relation to scattering of light by the irregular protrusions, scattering of light in a region of the light-scatter zone 151 closer to the second end 12 is greater compared to another region of the light-scatter zone 151 closer to the first end 11. It is worth noting that, in addition to the distribution density, other factors such as heights and outer radii of the irregular protrusions may affect the surface average roughness "Ra".

The reflecting element 20 is interposed between the light-guide strip 10 and the housing 30, and is secured to the housing 30. The first end 11 (i.e., the light-entry surface 13), the second end 12, and the light-exit surface 14 of the light-guide strip 10 are not shielded by the reflecting element 20. The reflecting element 20 has first and second reflecting portions 21, 22 parallel to each other and serving to reflect light that exits from the first and second working surfaces 15, 16, respectively, and a third reflecting portion 23 interconnecting the first and second reflecting portions 21, 22 and serving to reflect light that exits from the rear surface 17. The first, second, and third reflecting portions 21, 22, 23 extend in the first direction (X) and cooperate to form a first receiving space 24 for receiving the light-guide strip 10. In this embodiment, the first, second, and third reflecting portions 21, 22, 23 are formed from highly reflective sheets, and are spaced apart from the light-guide strip 10 by respective air gaps. Preferably, the first, second, and third reflecting portions 21, 22, 23 are paper sheets with a reflectivity higher than 80%. The paper sheets have non-specular surfaces, which favour scattering of light, such that the reflecting element 20 is able to reflect light that exits from the first and second non-working surfaces 15, 16 and the rear surface 17 back into the light-guide strip 10, thereby forcing light in the light-guide strip 10 to substantially exit via the light-exit surface 14 so as to improve the light-extraction efficiency of the light-guide strip 10.

Since the distribution density of the irregular protrusions (i.e., the light scattering ability of the irregular protrusions) increases from the first end 11 toward the second end 12, and the reflecting element 20 serves to reflect light that exits from the first working surface 15, the second working surface 16, and the rear surface 17 back into the light-guide strip 10, light extraction at portions of the light-exit surface 14 farther from a light source may be augmented. Furthermore, the light that exits from the light-exit surface 14 exhibits relatively weak or no directivity due to the irregularity of the irregular protrusions forming the micro-scatter structures 152.

The housing 30 is adapted to receive the light-guide strip 10 and the reflecting element 20, and includes first, second, third, and fourth sections 31-34 serving to shield the first, second, and third reflecting portions 21-23 of the reflecting element 20 and the second end 12 of the light-guide strip 10, respectively. The third section 33 extends in the first direction (X) and interconnects the first and second sections 31, 32. The fourth section 34 is connected to the first, second and third sections 31-33. The first, second, third, and fourth sections 31-34 cooperate to form a second receiving space 35 for receiving the light-guide strip 10 and the reflecting element 20.

In the present embodiment, the housing 30, to which the reflecting element 20 is secured, is made of metal. The housing 30 may be configured in relation to the reflecting element 20 to ensure that the air gap is present between the first working surface 15 and the first reflecting portion 21, between the second working surface 16 and the second reflecting portion 22, and between the rear surface 17 and the third reflecting portion 23, such that the first, second, and third reflecting portions 21-23 are able to reflect the light that exits via the corresponding surfaces 15-17 back into the light-guide strip 10.

The diffuser 40 is formed with a hole for receiving the housing 30, and serves to scatter light that exits from the light-exit surface 14. Moreover, through the use of the diffuser 40, the light-guide strip 10, the reflecting element 20, and the housing 30 may be integrated into a single product. Furthermore, the diffuser 40 may be stained with different colors according to design needs. It is worth noting that, in other embodiments, if only the scattering effect is to be achieved, the diffuser 40 may be a diffuser strip disposed corresponding to the light-exit surface 14.

The light-extinguishing element 50 is disposed inside the second receiving space 35, is substantially interposed between the fourth section 34 and the second end 12, and absorbs the light that exits via the second end 12.

Figure 9:
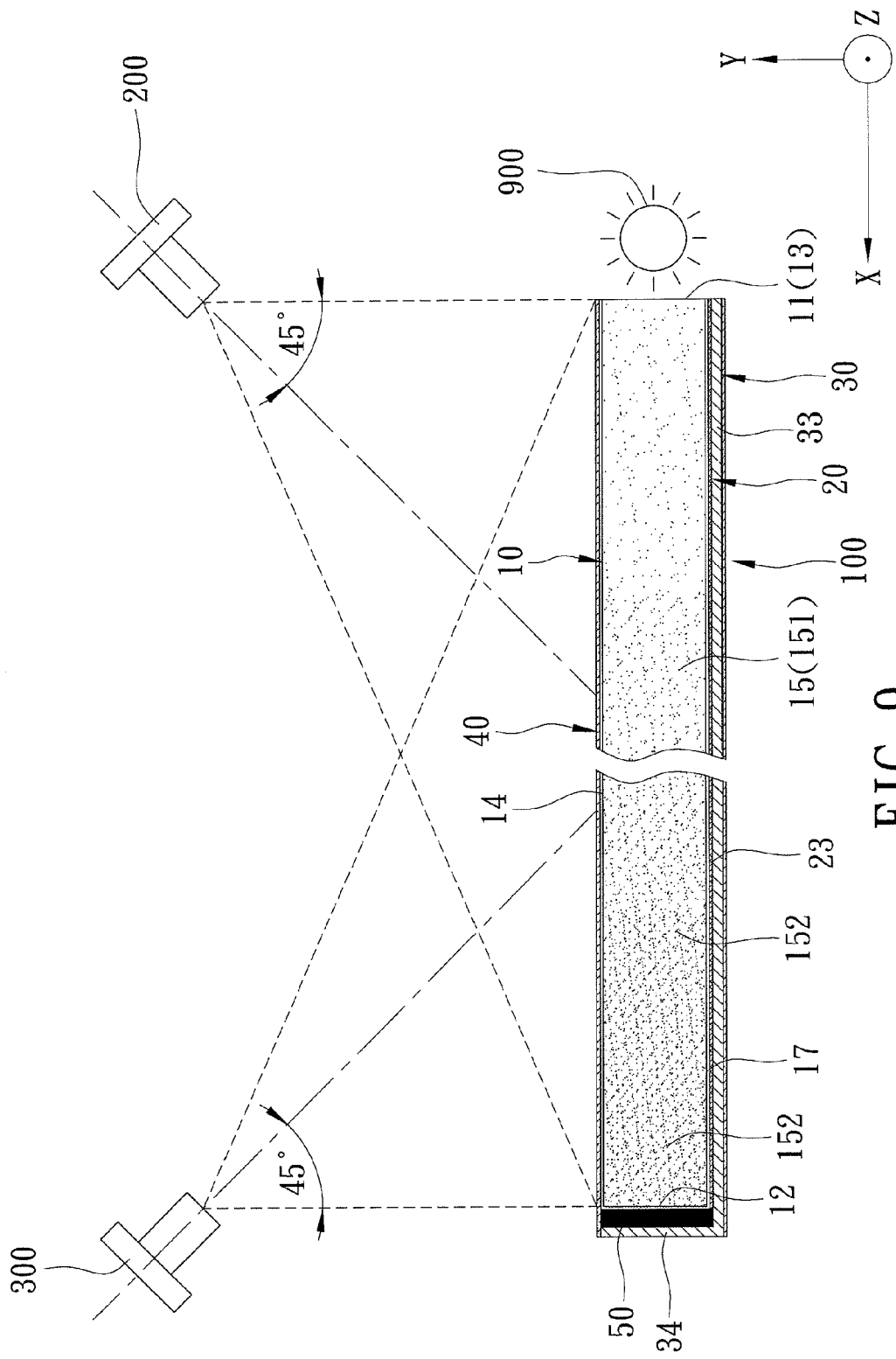
FIG. 9 is a schematic diagram to illustrate an application in which the light-guide module of the first preferred embodiment is applied to an optical touch-control system including first and second image-acquisition modules.

FIG. 9 is a schematic diagram to illustrate an application in which the light-guide module 100 of the first preferred embodiment is applied to an optical touch-control system having a length-width ratio of 16:9. The optical touch-control system includes first and second image-acquisition modules 200, 300 disposed at respective specific positions relative to the light-guide module 100. A light source 900 of the optical touch-control system is operable to emit light. The light emitted by the light source 900 enters the light-guide strip 10 via the light-entry surface 13, undergoes total reflection in the light-guide strip 10 as it propagates along the first direction (X), is scattered by the micro-scatter structures 152, is reflected by the reflecting element 20, and is scattered by the diffuser 40.

The first and second imaging image-acquisition modules 200, 300 acquire images corresponding to the light that exits via the light-exit surface 14 and the diffuser 40. In this embodiment, the light-guide module 100 is disposed along a longitudinal side of the optical touch-control system. The first image-acquisition module 200 is disposed such that an optical axis thereof forms a first included angle of 45° with a line extending perpendicular to the light-exit surface 14. The second image-acquisition module 300 is disposed such that an optical axis thereof forms a second included angle of 45° with a line extending perpendicular to the light-exit surface 14. For each of the first and second image-acquisition modules 200, 300, the optical axis intersects with the light-guide module 100. Such a configuration ensures that the light that exits via the diffuser 40 passes through both sides of each of the optical axes and subsequently enters the first and second image-acquisition modules 200, 300.

Figure 10:
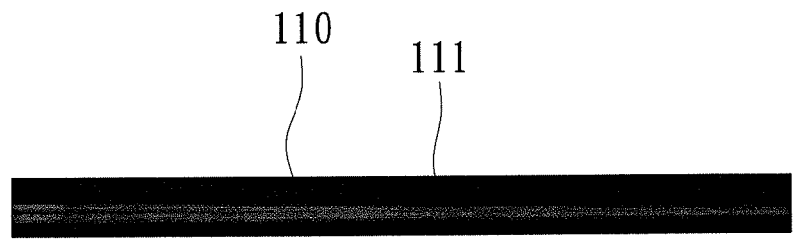
FIG. 10 is an image captured by the first image-acquisition module.
Figure 11:
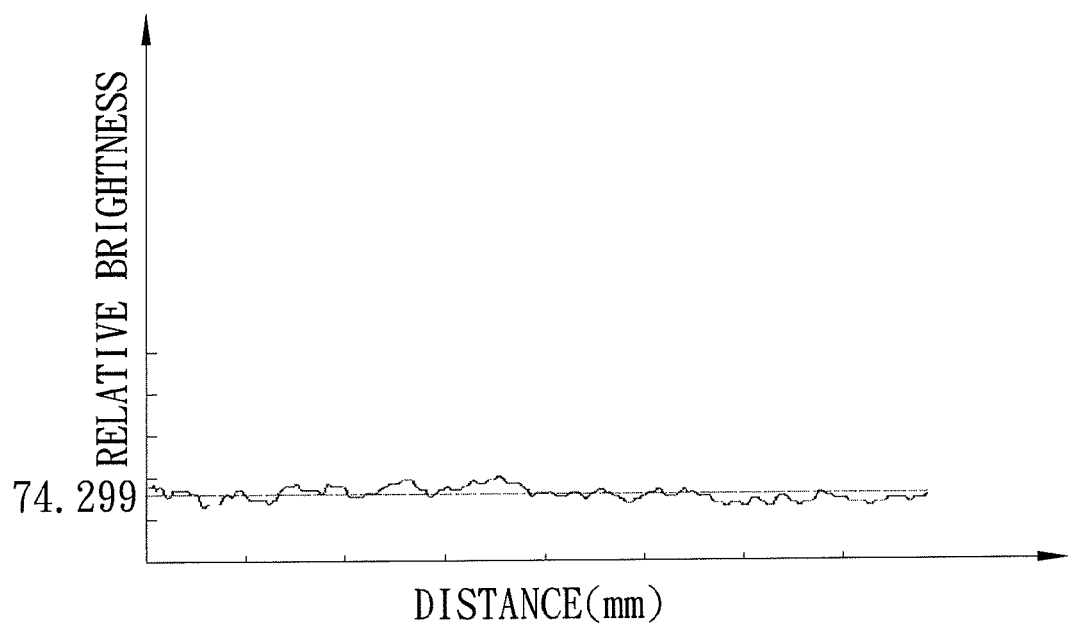
FIG. 11 is a plot of relative brightness distribution along a bright band of the image captured by the first image-acquisition module.

Shown in FIG. 10 is an image 110 captured by the first image-acquisition module 200 in the configuration illustrated in FIG. 9. In the image 110, the bright band 111 is representative of the light that exits via the diffuser 40, the left end of the bright band 111 corresponds to the first end 11 (i.e., the light-entry surface 13), and the right end of the bright band 111 corresponds to the second end 12. Shown in FIG. 11 is a plot of relative brightness distribution along the bright band 111 of the image 110, which shows an average relative brightness of 74.299. In such a configuration, a difference between a maximum relative brightness and the average relative brightness is 21.701 (i.e., 29.3% relative to the average relative brightness), and a difference between the average relative brightness and a minimum relative brightness is 14.299 (i.e., 19.2% relative to the average relative brightness). It is apparent that the difference between the maximum relative brightness and the average relative brightness, and that between the average relative brightness and the minimum relative brightness, are below 30% of the average relative brightness. That is to say, a distribution curve of the relative brightness measured along the first direction (X), from the first end 11 to second end 12, is substantially flat. Therefore, in such a configuration, an image captured by the first image-acquisition module 200 has a substantially uniform relative brightness distribution.

Figure 12:
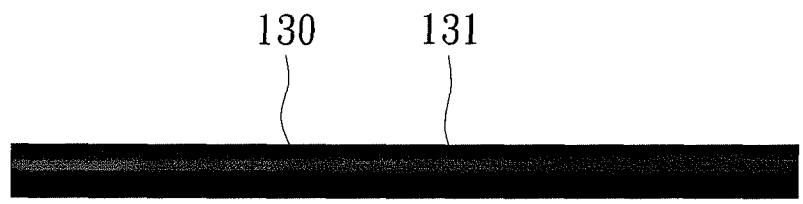
FIG. 12 is an image captured by the second image-acquisition module.
Figure 13:
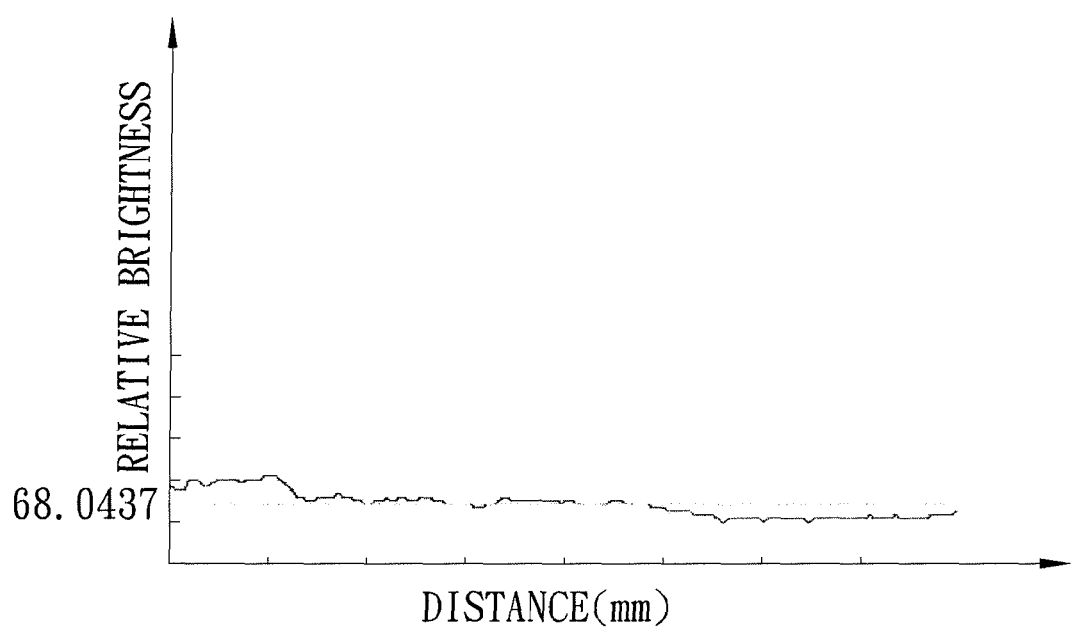
FIG. 13 is a plot of relative brightness distribution along a bright band of the image captured by the second image-acquisition module.

Shown in FIG. 12 is an image 130 captured by the second image-acquisition module 300 in the configuration illustrated in FIG. 9. In the image 130, the bright band 131 is representative of light that exits via the diffuser 40, the left end of the bright band 131 corresponds to the first end 11 (i.e., the light-entry surface 13), and the right end of the bright band 131 corresponds to the second end 12. Shown in FIG. 13 is a plot of relative brightness distribution along the bright band 131 of the image 130, which shows an average relative brightness of 68.0437. In such a configuration, a difference between a maximum relative brightness and the average relative brightness is 31.9563 (i.e., 47.0% relative to the average relative brightness), and a difference between the average relative brightness and a minimum relative brightness is 20.0437 (i.e., 29.9% relative to the average relative brightness). It is apparent that the difference between the maximum relative brightness and the average relative brightness, and that between the average relative brightness and the minimum relative brightness, are smaller than 47.0% of the average relative brightness. That is to say, a distribution curve of the relative brightness measured along the first direction (X), from the first end 11 to second end 12, is substantially flat. Therefore, in such a configuration, an image captured by the second image-acquisition module 300 has a substantially uniform relative brightness distribution.

It can be understood from the above description that, in the aforesaid configuration, for each of the images 110, 130, the difference between the maximum relative brightness and the average relative brightness, and that between the average relative brightness and the minimum relative brightness are below 50% of the average relative brightness. Therefore, the images 110, 130 have substantially uniform relative brightness distributions.

Furthermore, since the surface average roughness "Ra" of the light-scatter zone 151 (i.e., the distribution density of the micro-scatter structures 152) increases from the first end 11 toward the second end 12, the amount of scattering to which light in the light-guide strip 10 is subjected also increases from the first end 11 toward the second end 12, which compensates for brightness reduction as light propagates from the first end 11 toward the second end 12, such that light that exits from the light-exit surface 14 has a substantially uniform distribution of illumination. In addition, since the irregular protrusions that form the micro-scatter structures 152 provide a scattering effect with relatively weak or no directivity, the images 110, 130 captured by the first and second image-acquisition modules 200, 300 have substantially uniform relative brightness distributions.

Moreover, the reflecting element 20 serves to reflect light that exits from the first and second working surfaces 15, 16 and the rear surface 17 back into the light-guide strip 10, and the light-extinguishing element 50 serves to absorb light that exits the second end 12, which ensures that most of the light entering the light-guide strip 10 via the light-entry surface 13 exits via the light-exit surface 14.

Currently, due to technical limitations, capacitive-type and resistive-type touch-screen techniques are generally used only for screen sizes that are below 14 inches. As for screen sizes that are larger than 20 inches, other touch-control techniques, such as optical touch-control systems, are employed. In this embodiment, the light-guide strip 10 has a length (L) of 475 mm, corresponding to a longitudinal side of a 21-inch touch-screen, and is adapted for use with another light-guide strip corresponding to a lateral side of the 21-inch touch-screen. It is noted that a conventional light-guide strip having a cross-section that varies along the length thereof may be unsuited in display applications where there are dimensional restrictions in terms of width and height of the strip. In the present invention, the light-guide strip 10 has a uniform cross-section along the length thereof, which makes it suitable for display applications where there are dimensional restrictions in terms of width and height of the strip.

Furthermore, in a conventional light-guide strip, a complex scattering structure is usually engraved in the rear surface opposite to the light-exit surface. However, since the light-guide strip has a slender design, the scattering structure in the rear surface having a slender area must be sufficiently large to result in an evident light-scattering effect. Accordingly, such a scattering structure can hardly be called a micro-structure, and a bright-dark pattern attributed to the macro scattering structure is visible from the light-exit surface, which has an adverse affect on brightness of light exiting the light-exit surface. In contrast, in the present invention, the light-scatter zone 151 is defined in the first working surface 15, which has a relatively large area compared to the rear surface 17. In display applications with a width restriction of 4-10 mm and a height restriction of 1-4 mm, the width of the first working surface 15 could be set to 4 mm and the height of the rear surface 17 could be set to 1.6 mm. Accordingly, the area of the first working surface 15 could be twice the area of the rear surface 17. Since the first working surface 15 could provide a larger area to accommodate a large number of the micro-scatter structures 152, the micro-scatter structures 152 need not be large to ensure the light-scattering effect, thereby avoiding the problem of a bright-dark pattern at the light-exit surface 14.

Figure 14:
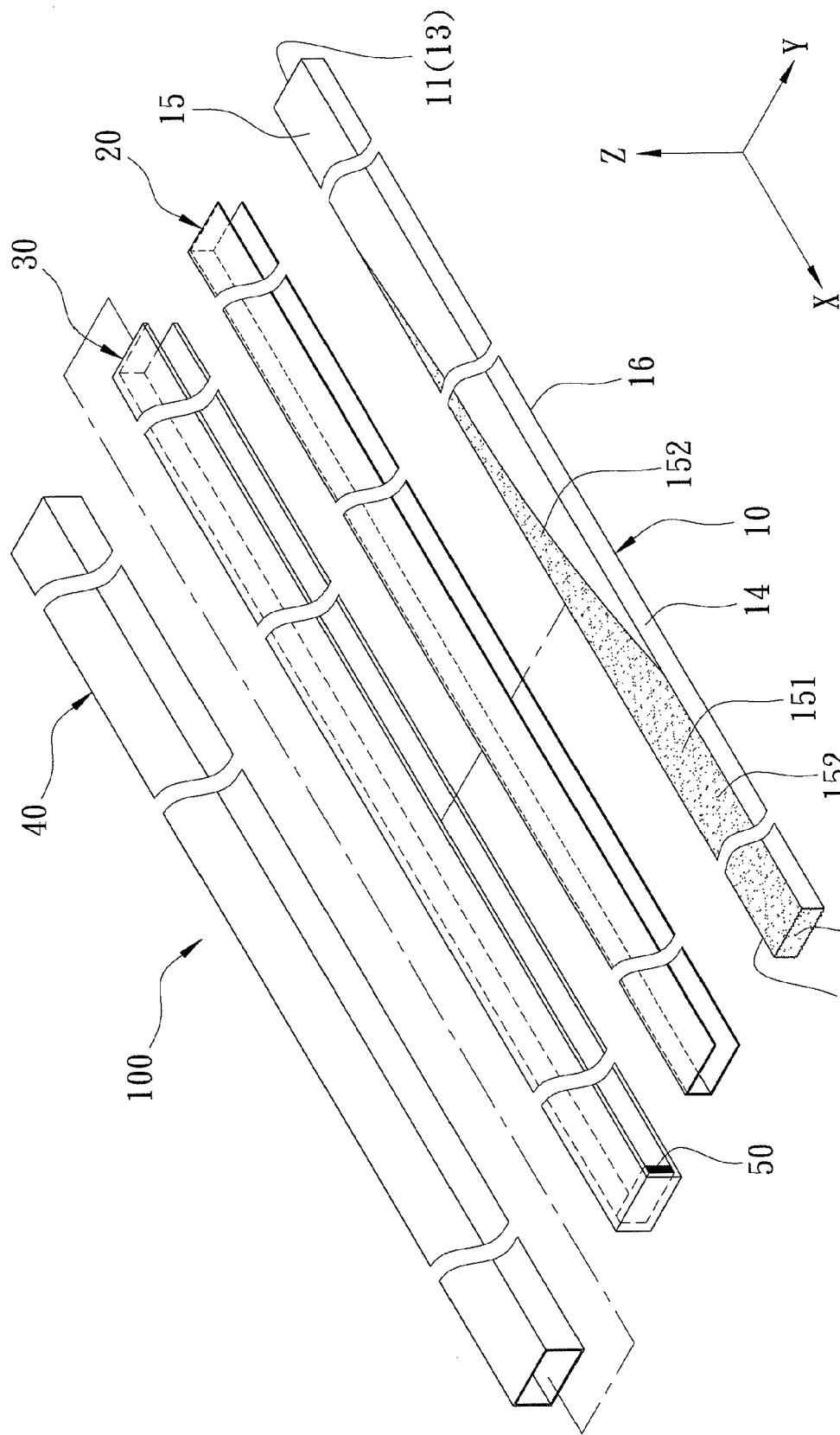
FIG. 14 is an exploded perspective view of the second preferred embodiment of a light-guide module including a light-guide strip according to the present invention.
Figure 15:
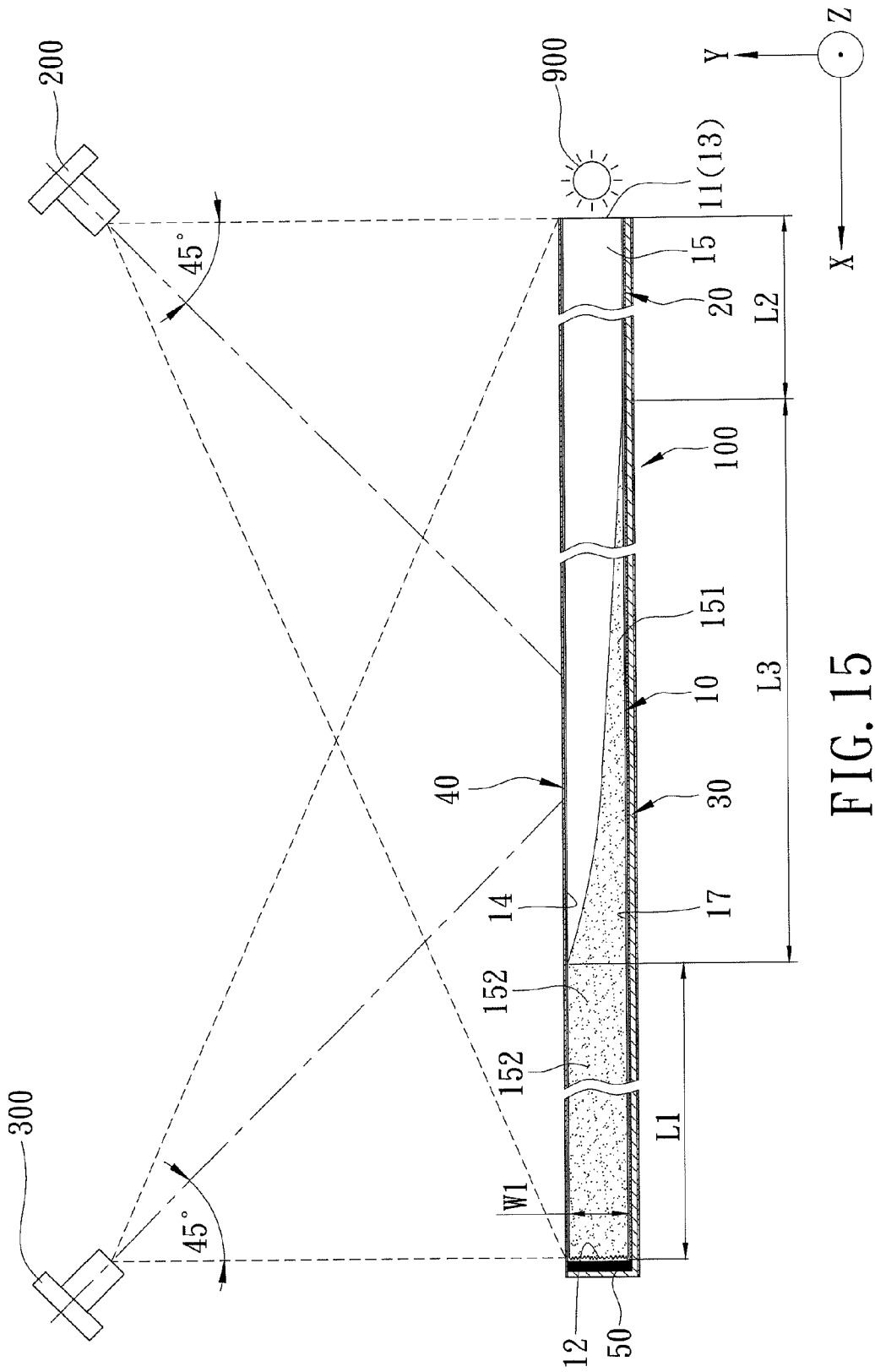
FIG. 15 is a schematic diagram to illustrate an application in which the light-guide module of the second preferred embodiment is applied to an optical touch-control system including first and second image-acquisition modules.

Referring to FIGS. 14 and 15, the second preferred embodiment of this invention differs from the first preferred embodiment in that, in the second preferred embodiment, the light-scatter zone 151 is divided into first, second, and third sections L1, L2, L3 along the first direction (X). In the first section L1, which is proximate to the second end 12, the width, measured from the rear surface 17 toward the light-exit surface 14, is non-varying and is equal to W1. In the second section L2, which is proximate to the first end 11, the width is non-varying and is equal to zero. In the third section L3, which is between the first and second sections L1, L2, the width, measured from the rear surface 17 toward the light-exit surface 14, increases gradually toward the second end 12. In this embodiment, the first, second, and third sections L1, L2, L3 have lengths of 50 mm, 35 mm, and 380 mm, respectively.

It is to be noted that, in this embodiment, the micro-scatter structures 152 are formed by irregular protrusions having a uniform density distribution between the first and second ends 11, 12. The light-scatter zone 151 has a surface average roughness "Ra" not smaller than 3 μm and not larger than 6 μm (preferably, not smaller than 4 μm and not larger than 5 μm).

Since the width of the light-scatter zone 151 near the second end 12 is wider than that near the first end 11, more irregular protrusions are present near the second end 12 compared to near the first end 11. Therefore, light-scattering effect in the light-guide strip 10 is better near the second end 12 compared to near the first end 11, such that the light that exits via the light-exit surface 14 farther from a light source may be compensated by the light-scatter zone 151, thereby achieving substantially uniform brightness distribution between the first and second ends 11, 12.

Figure 16:
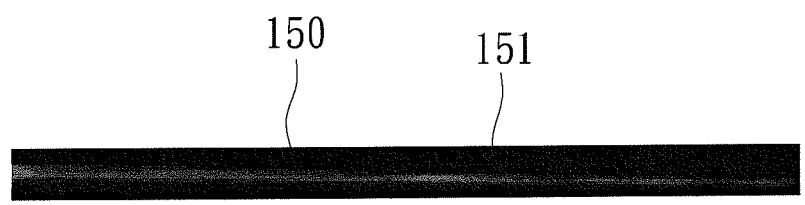
FIG. 16 is an image captured by the first image-acquisition module in the configuration illustrated in FIG. 15.
Figure 17:
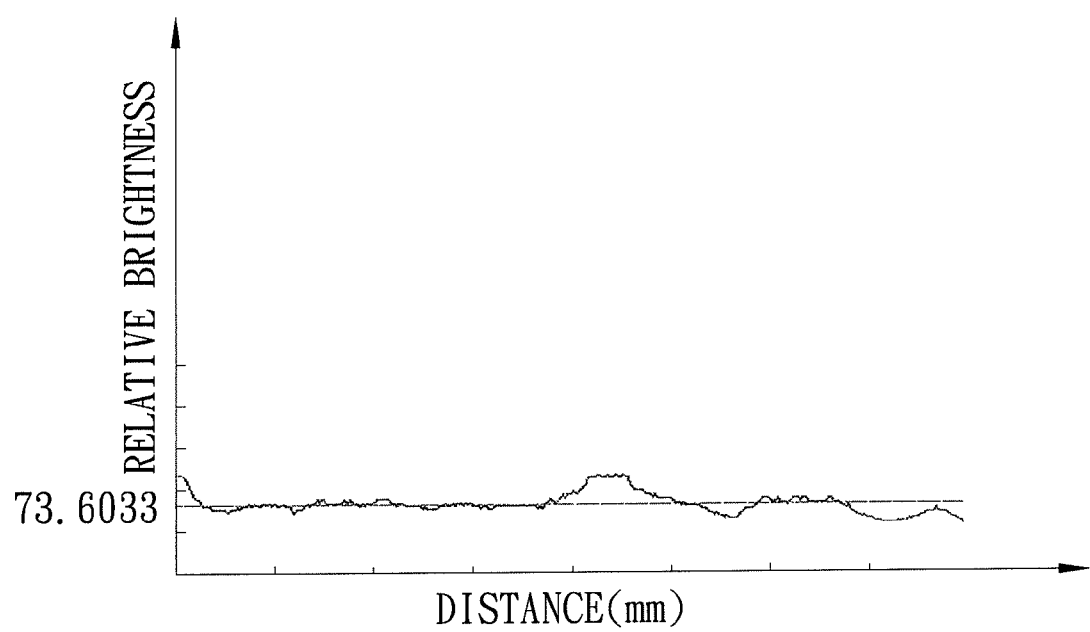
FIG. 17 is a plot of relative brightness distribution along a bright band of the image captured by the first image-acquisition module in the configuration illustrated in FIG. 15.

Shown in FIG. 16 is an image 150 captured by the first image-acquisition module 200. In the image 150, the bright band 151 is representative of the light that exits via the diffuser 40, the left end of the bright band 151 corresponds to the first end 11 (i.e., the light-entry surface 13), and the right end of the bright band 151 corresponds to the second end 12. Shown in FIG. 17 is a plot of relative brightness distribution along the bright band 151 of the image 150, which shows an average relative brightness of 73.6033. In such a configuration, a difference between a maximum relative brightness and the average relative brightness is 30.1467 (i.e., 40.9% relative to the average relative brightness), and a difference between the average relative brightness and a minimum relative brightness is 22.8533 (i.e., 31.0% relative to the average relative brightness). It is apparent that the difference between the maximum relative brightness and the average relative brightness, and that between the average relative brightness and the minimum relative brightness, are smaller than 41% of the average relative brightness. That is to say, a distribution curve of the relative brightness measured along the first direction (X), from the first end 11 to second end 12, is substantially flat. Therefore, in such a configuration, an image captured by the first image-acquisition module 200 has a substantially uniform relative brightness distribution.

Figure 18:
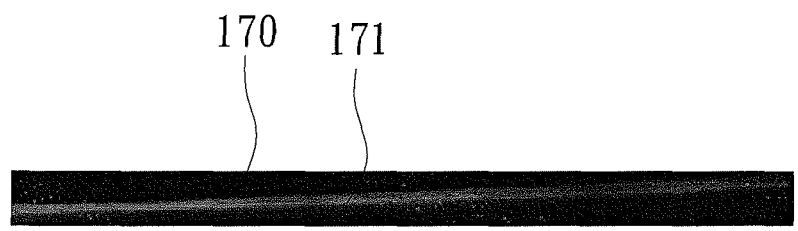
FIG. 18 is an image captured by the second image-acquisition module in the configuration illustrated in FIG. 15.
Figure 19:
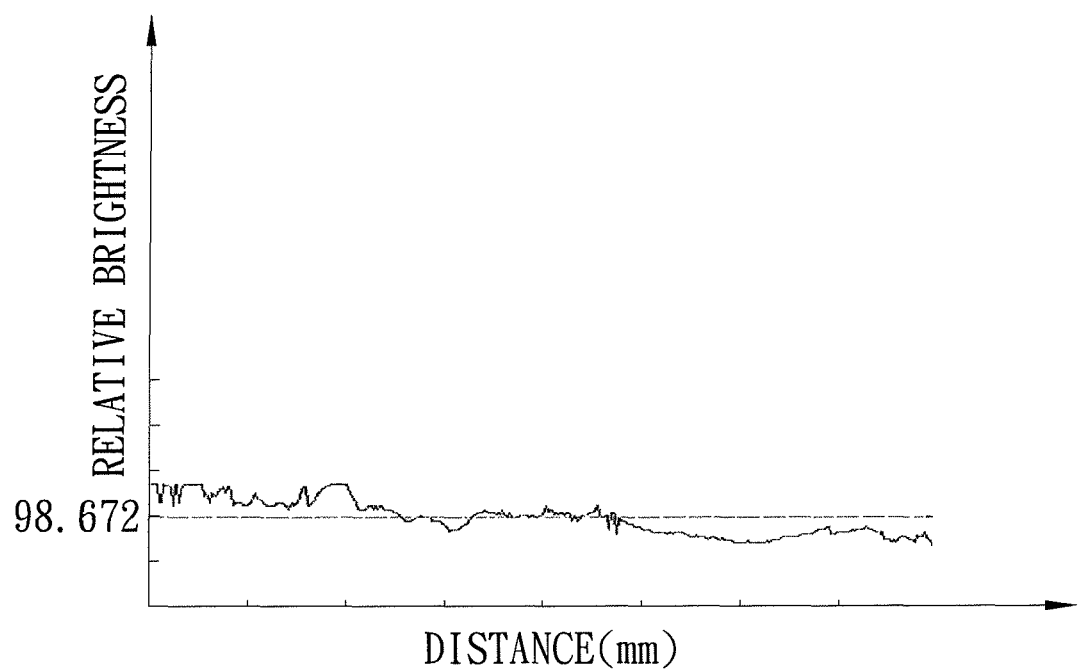
FIG. 19 is a plot of relative brightness distribution along a bright band of the image captured by the second image-acquisition module in the configuration illustrated in FIG. 15.

Shown in FIG. 18 is an image 170 captured by the second image-acquisition module 300. In the image 170, the bright band 171 is representative of the light that exits via the diffuser 40, the left end of the bright band 171 corresponds to the first end 11 (i.e., the light-entry surface 13), and the right end of the bright band 171 corresponds to the second end 12. Shown in FIG. 19 is a plot of relative brightness distribution along the bright band 171 of the image 170, which shows an average relative brightness of 98.672. In such a configuration, a difference between a maximum relative brightness and the average relative brightness is 36.328 (i.e., 36.8% relative to the average relative brightness), and a difference between the average relative brightness and a minimum relative brightness is 30.672 (i.e., 31.1% relative to the average relative brightness). It is apparent that the difference between the maximum relative brightness and the average relative brightness, and that between the average relative brightness and the minimum relative brightness, are smaller than 37% of the average relative brightness. That is to say, a distribution curve of the relative brightness measured along the first direction (X), from the first end 11 to second end 12, is substantially flat. Therefore, in such a configuration, an image captured by the second image-acquisition module 300 has a substantially uniform relative brightness distribution.

Accordingly, the second preferred embodiment has the same advantages as the first preferred embodiment.

Figure 20:
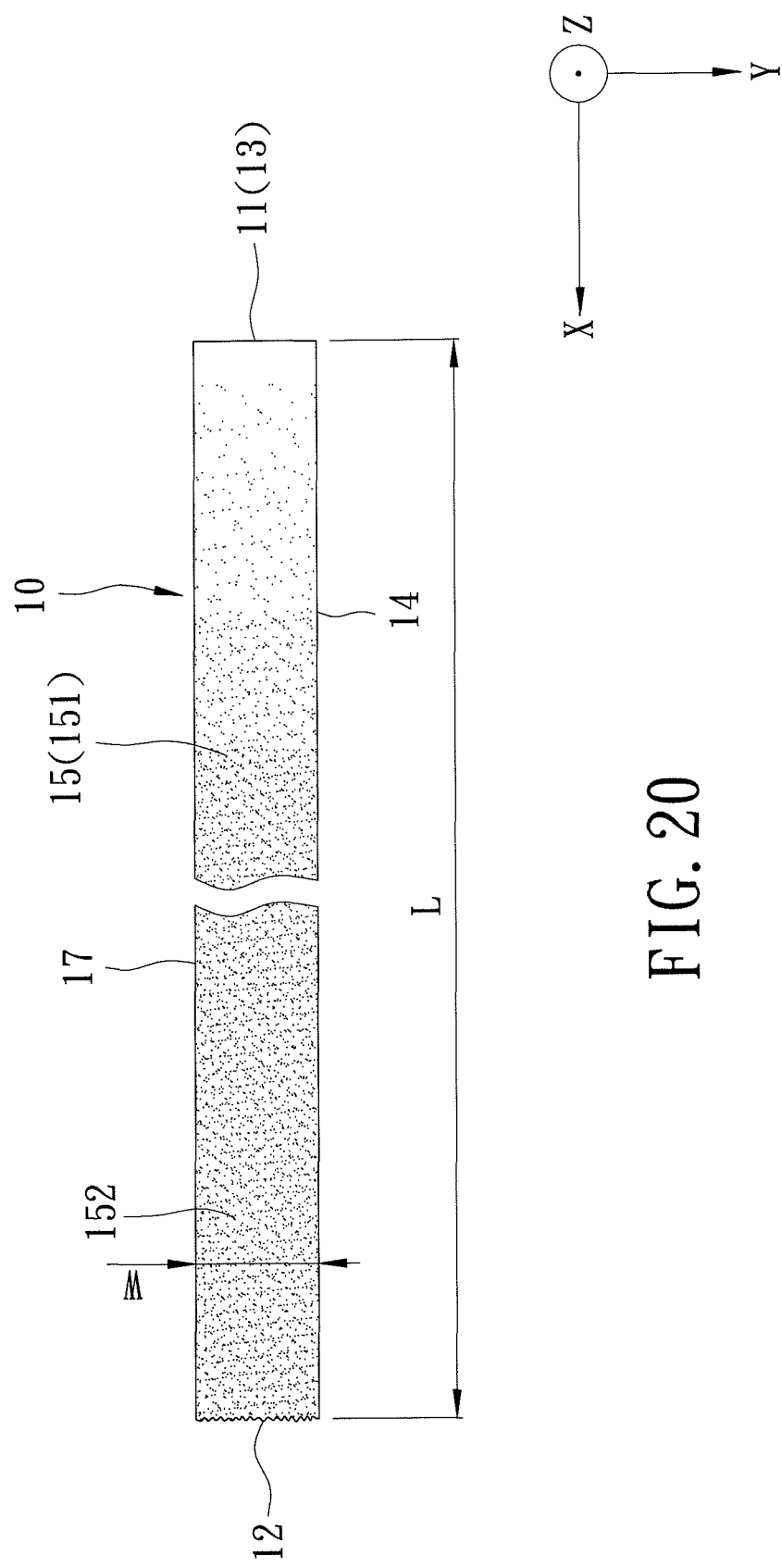
FIG. 20 is a schematic diagram to illustrate a light-guide strip of the third preferred embodiment of a light-guide module according to the present invention.

Referring to FIG. 20, the third preferred embodiment of this invention differs from the first preferred embodiment in that, in the third preferred embodiment, the light-guide strip 10 has a length (L) of 267 mm, and the first working surface 15 thereof has a length-width ratio of $267/4 \approx 66 > 50$. The light-guide strip 10 of this embodiment is applicable to the lateral side of the aforesaid optical touch-control system having a length-width ratio of 16:9.

Figure 21:
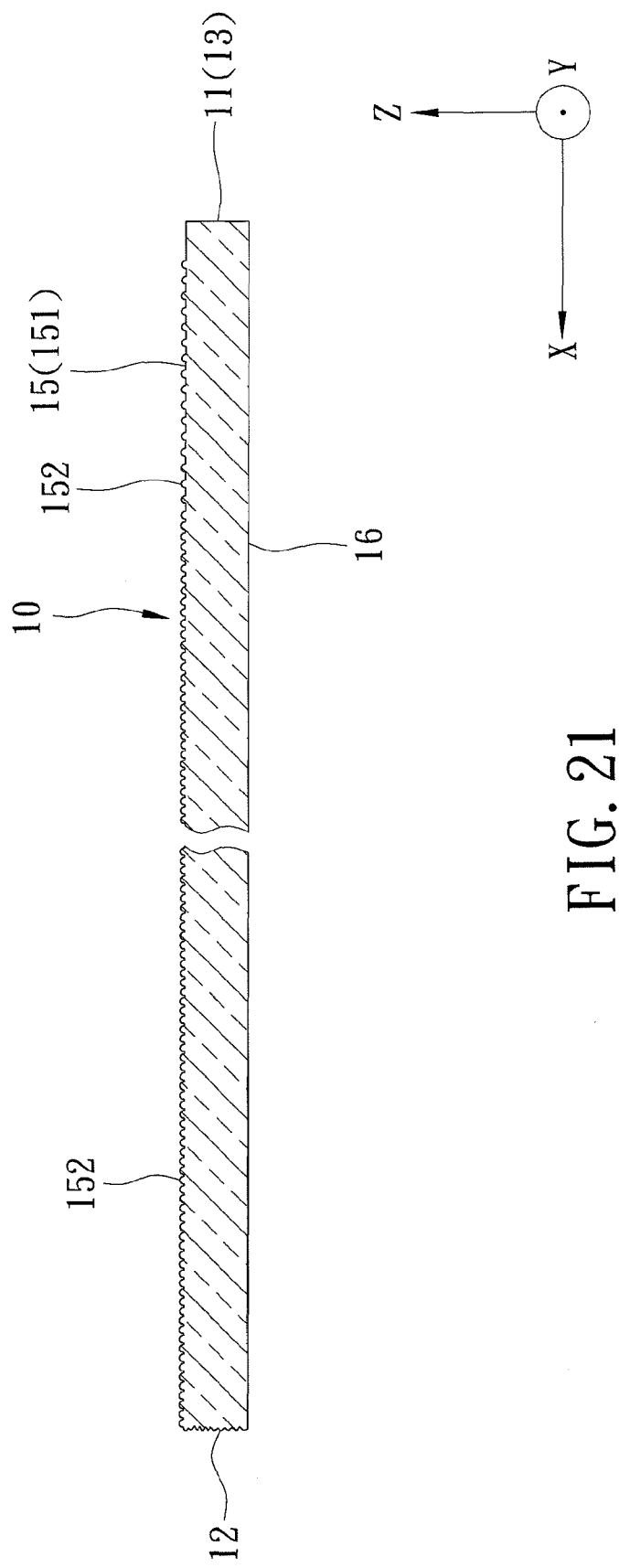
FIG. 21 is a fragmentary schematic sectional diagram to illustrate the light-guide strip of the third preferred embodiment.
Figure 22:
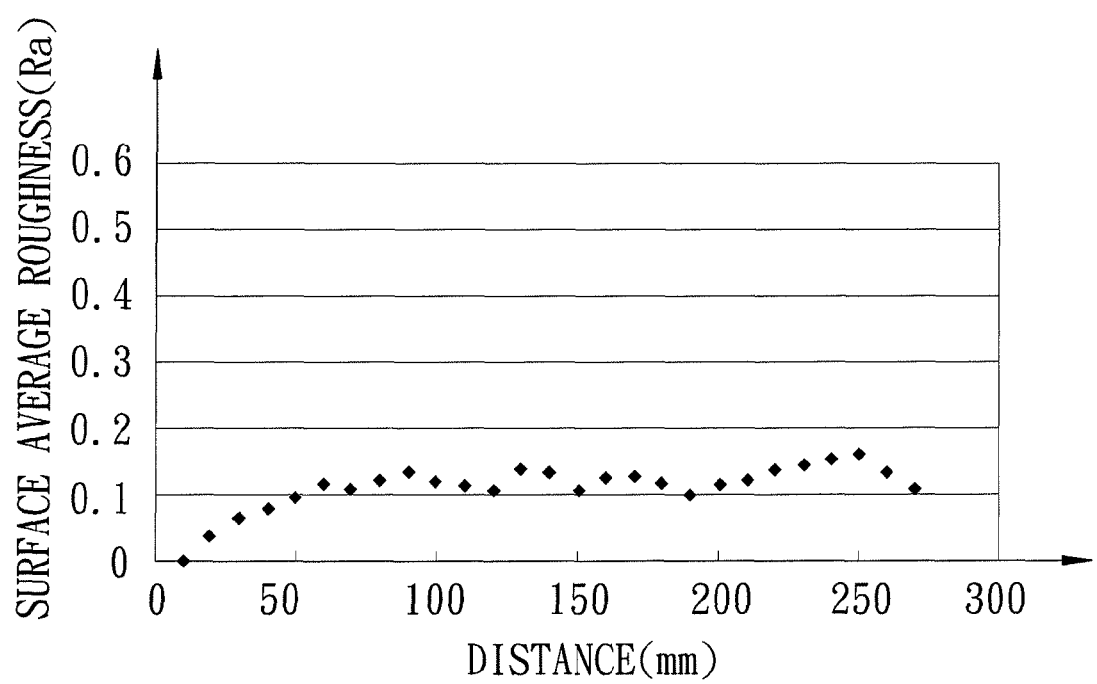
FIG. 22 is a plot of surface average roughness of a light-scatter zone defined by a first working surface of the light-guide strip of the third preferred embodiment at different distances from a first end of the light-guide strip toward a second end of the same.

Referring to Table 2 below and FIGS. 21 and 22, in the third preferred embodiment, the light-scatter zone 151 is divided into a first subzone, which is adjacent to the first end 11, and a second subzone, which is adjacent to the second end 12. In the first subzone, the surface average roughness "Ra" increases from the first end 11 toward the second end 12. In the second subzone, the surface average roughness "Ra" is substantially equal to the surface average roughness "Ra" of the roughest portion (i.e., the leftmost portion) in the first subzone. It is to be noted that "d" represents a distance in millimeters from the first end 11 toward the second end 12.

TABLE 2

| d(mm) | 5 | 15 | 25 | 35 | 45 | 55 | 65 |
|---|---|---|---|---|---|---|---|
| Ra | 0.0029 | 0.041 | 0.0679 | 0.0782 | 0.095 | 0.1178 | 0.1078 |
| d(mm) | 75 | 85 | 95 | 105 | 115 | 125 | 135 |
| Ra | 0.1223 | 0.1365 | 0.1228 | 0.1152 | 0.1104 | 0.1378 | 0.1347 |
| d(mm) | 145 | 155 | 165 | 175 | 185 | 195 | 205 |
| Ra | 0.1082 | 0.1276 | 0.1284 | 0.1178 | 0.1031 | 0.1161 | 0.1218 |
| d(mm) | 215 | 225 | 235 | 245 | 255 | 265 | — |
| Ra | 0.1395 | 0.1461 | 0.1555 | 0.1612 | 0.1361 | 0.1087 | — |

The roughness at distances of 10% (26.7 mm), 50% (133.5 mm), and 90% (240.3 mm) of the length (L) from the first end 11 toward the second end 12 may be represented by Ra(0.1L), Ra(0.5L), and Ra(0.9L), respectively.

In this embodiment, the light-guide strip 10 satisfies the conditions of:

$$Ra(0.5L)/Ra(0.1L) > 1.5 \qquad (3)$$

$$Ra(0.9L)/Ra(0.1L) > 1.5 \qquad (4)$$

$$0.4 < Ra(0.5L)/Ra(0.9L) < 2 \qquad (5)$$

Since the length (L) of the light-guide strip 10 in this embodiment is 267 mm:

$$Ra(0.5L)/Ra(0.1L) = 0.1347/0.0679 = 1.98 > 1.5$$

$$Ra(0.9L)/Ra(0.1L) = 0.1555/0.0679 = 2.29 > 1.5$$

$$0.4 < Ra(0.5L)/Ra(0.9L) = 0.1347/0.1555 = 0.86 < 2$$

Since the micro-scatter structures 152 are formed by the irregular protrusions with a distribution density that increases toward the second end 12 in the first subzone and that is substantially non-varying in the second subzone, and the distribution density of the irregular protrusions has a positive relation to light-scattering ability of the irregular protrusions, the extent of scattering by the irregular protrusions increases from the first end 11 toward the second end 12 in the first subzone, and stabilizes in the second subzone. The micro-scatter structures 152 formed by the irregular protrusions cooperate with the reflecting element 20 to compensate in part for brightness reduction that occurs to the light in the light-guide strip 10 as it propagates away from the light source.

Figure 23:
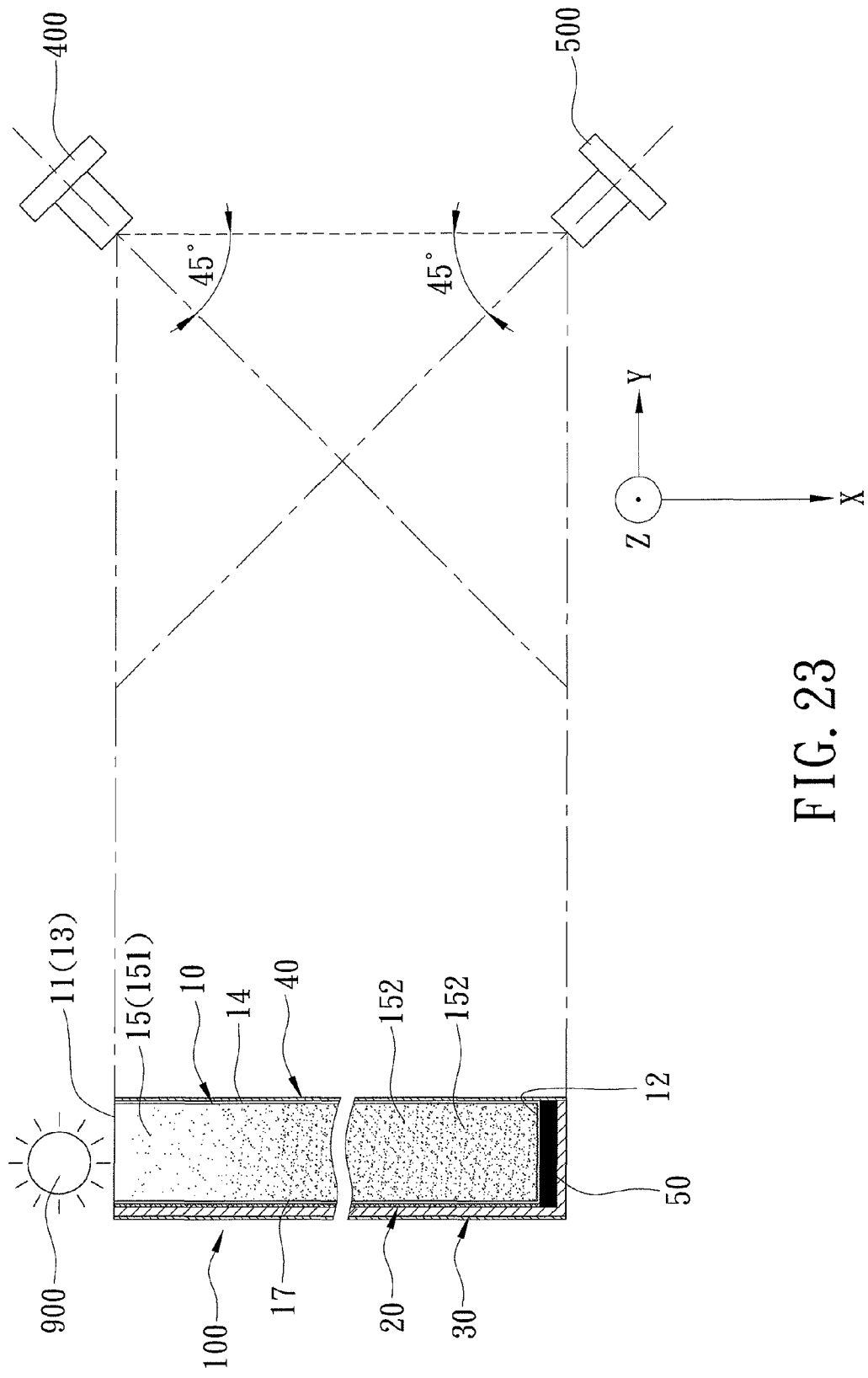
FIG. 23 is a schematic diagram to illustrate an application in which the light-guide module of the third preferred embodiment is applied to an optical touch-control system including third and fourth image-acquisition modules.

FIG. 23 is a schematic diagram to illustrate an application in which the light-guide module 100 of the third preferred embodiment is applied to a lateral side of an optical touch-control system. The optical touch-control system includes third and fourth image-acquisition modules 400, 500 disposed at respective specific positions relative to the light-guide module 100. A light source 900 of the optical touch-control system is operable to emit light. The light emitted by the light source 900 enters the light-guide strip 10 via the light-entry surface 13, undergoes total reflection as it propagates along the first direction (X), is scattered by the micro-scatter structures 152, is reflected by the reflecting element 20, and is scattered by the diffuser 40.

The third and fourth imaging image-acquisition modules 400, 500 acquire images corresponding to the light that exits via the diffuser 40. The third image-acquisition module 400 is disposed such that an optical axis thereof forms a third included angle of 45° with a line parallel to the light-exit surface 14. The fourth image-acquisition module 500 is disposed such that an optical axis thereof forms a fourth included angle of 45° with the line parallel to the light-exit surface 14. For each of the third and fourth image-acquisition modules 400, 500, the optical axis thereof does not intersect the light-guide module 100. In contrast to the first and second preferred embodiments, such a configuration ensures that the light that exits via the diffuser 40 passes through one side of each of the optical axes instead of both sides of each of the optical axes, and subsequently enters the third and fourth image-acquisition modules 400, 500. With the distribution of the micro-scatter structures 152 that increases toward the second end 12 in the first subzone and that is substantially non-varying in the second subzone, refraction of too much light from the light-exit surface 14 near the second 12 may be avoided.

Figure 24:
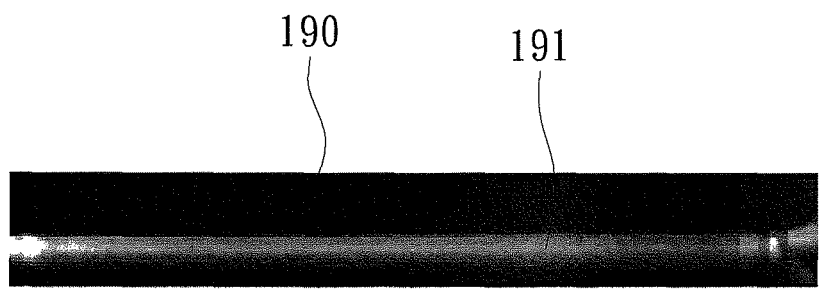
FIG. 24 is an image captured by the third image-acquisition module in the configuration illustrated in FIG. 23.
Figure 25:
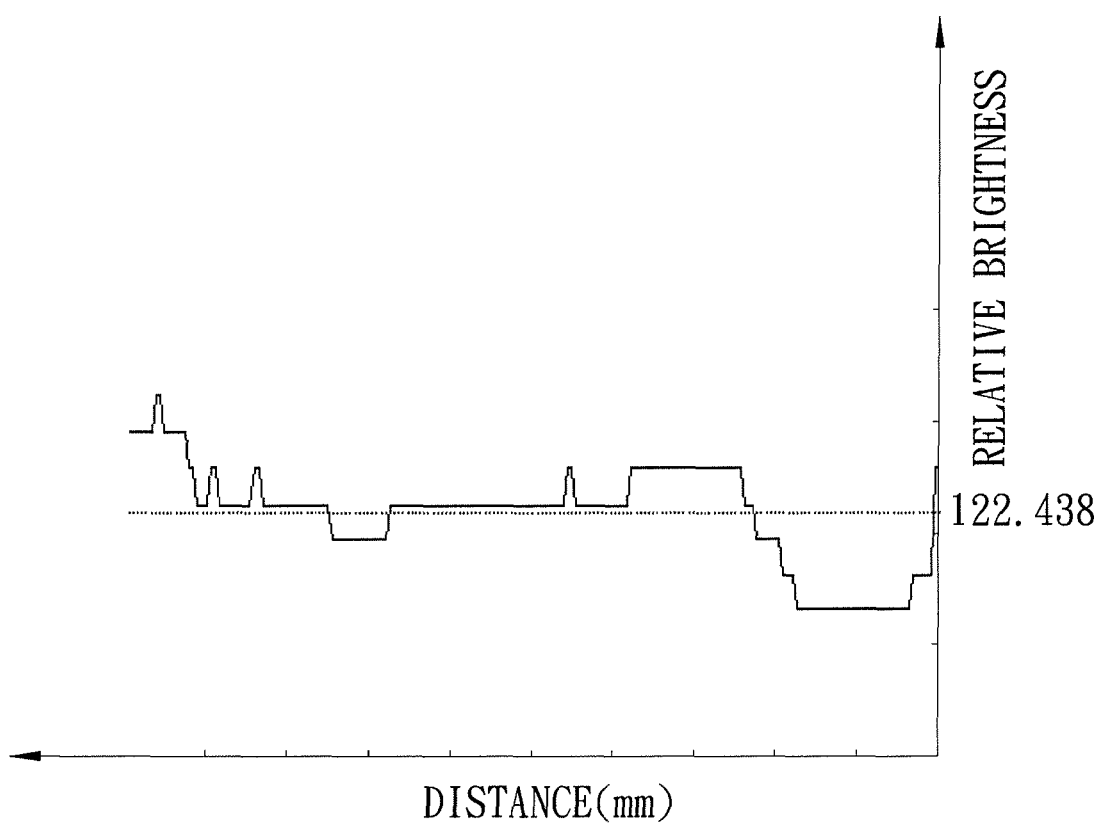
FIG. 25 is a plot of relative brightness distribution along a bright band of the image captured by the third image-acquisition module in the configuration illustrated in FIG. 23.

Shown in FIG. 24 is an image 190 captured by the third image-acquisition module 400 in the configuration illustrated in FIG. 23. In the image 190, the bright band 191 is representative of the light that exits via the diffuser 40, the right end of the bright band 191 corresponds to the first end 11 (i.e., the light-entry surface 13), and the left end of the bright band 191 corresponds to the second end 12. Shown in FIG. 25 is a plot of relative brightness distribution along the bright band 191 of the image 190, which shows an average relative brightness of 122.438. In such a configuration, a difference between a maximum relative brightness and the average relative brightness is 36.966 (i.e., 30.1% relative to the average relative brightness), and a difference between the average relative brightness and a minimum relative brightness is 29.9352 (i.e., 24.4% relative to the average relative brightness). It is apparent that the difference between the maximum relative brightness and the average relative brightness, and that between the average relative brightness and the minimum relative brightness, are below 31% of the average relative brightness. That is to say, a distribution curve of the relative brightness measured along the first direction (X), from the first end 11 to the second end 12, is substantially flat. Therefore, in such a configuration, an image captured by the third image-acquisition module 400 has a substantially uniform relative brightness distribution.

Figure 26:
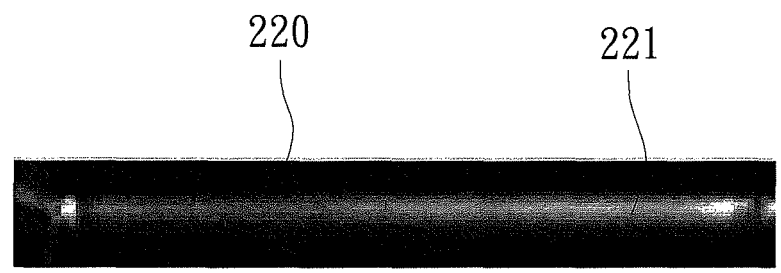
FIG. 26 is an image captured by the fourth image-acquisition module in the configuration illustrated in FIG. 23.
Figure 27:
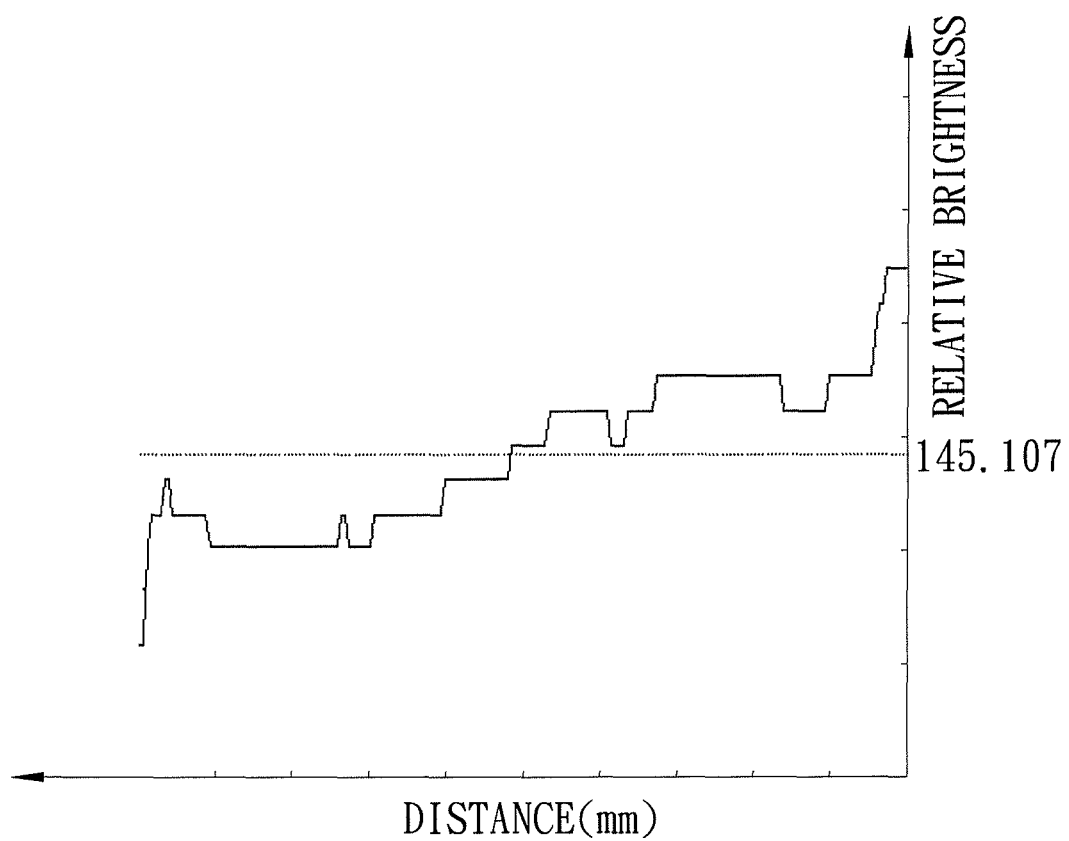
FIG. 27 is a plot of relative brightness distribution along a bright band of the image captured by the fourth image-acquisition module in the configuration illustrated in FIG. 23.

Shown in FIG. 26 is an image 220 captured by the fourth image-acquisition module 500 in the configuration illustrated in FIG. 23. In the image 220, the bright band 221 is representative of light that exits via the diffuser 40, the right end of the bright band 221 corresponds to the first end 11 (i.e., the light-entry surface 13), and the left end of the bright band 221 corresponds to the second end 12. Shown in FIG. 27 is a plot of relative brightness distribution along the bright band 221 of the image 220, which shows an average relative brightness of 145.107. In such a configuration, a difference between a maximum relative brightness and the average relative brightness is 61.6647 (i.e., 42.4% relative to the average relative brightness), and a difference between the average relative brightness and a minimum relative brightness is 63.1316 (i.e., 43.5% relative to the average relative brightness). It is apparent that the difference between the maximum relative brightness and the average relative brightness, and that between the average relative brightness and the minimum relative brightness, are smaller than 44.00 of the average relative brightness. That is to say, a distribution curve of the relative brightness measured along the first direction (X), from the first end 11 to the second end 12, is substantially flat. Therefore, in such a configuration, an image captured by the fourth image-acquisition module 500 has a substantially uniform relative brightness distribution.

It can be understood from the above description that, in the aforesaid configuration, for each of the images 190, 220, the difference between the maximum relative brightness and the average relative brightness, and that between the average relative brightness and the minimum relative brightness are below 50% of the average relative brightness. Therefore, the images 190, 220 have substantially uniform relative brightness distributions.

Accordingly, the third preferred embodiment has the same advantages as the first preferred embodiment.

In summary, the light-guide module 100 of each of the preferred embodiments is able to direct light toward multiple specific positions with substantially uniform relative brightness distributions.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A light-guide module comprising:
a light-guide strip having opposite first and second ends, a light-entry surface disposed at said first end, a light-exit surface extending between said first and second ends, and first and second working surfaces disposed parallel to each other and extending between said first and second ends, each of said first and second working surfaces being connected to said first end, said second end, and said light-exit surface, one of said first and second working surfaces defining a light-scatter zone and including a plurality of micro-scatter structures that are disposed within said light-scatter zone and that configure said light-scatter zone with a light-scattering ability that varies from said first end to said second end, each of said first and second working surfaces having an area greater than that of said light-exit surface; and
a reflecting element disposed to reflect light that exits from said light-guide strip via said first and second working surfaces back into said light-guide strip via said first and second working surfaces, respectively;
wherein said light-scatter zone satisfies the conditions of:

$$Ra(0.75L)/Ra(0.25L) \geq 2$$

$$Ra(0.95L)/Ra(0.25L) \geq 5$$

wherein L represents a length of said light-scatter zone from said first end to said second end, and Ra(0.25L), Ra(0.75L), and Ra(0.95L) represent roughness of said light-scatter zone at distances of 25%, 75%, and 95% of the length of said light-scatter zone from said first end toward said second end, respectively.

2. The light-guide module as claimed in claim 1, wherein said one of said first and second working surfaces has a length-width ratio not smaller than 50.

3. The light-guide module as claimed in claim 1, wherein said one of said first and second working surfaces is formed with a plurality of irregular protrusions within said light-scatter zone, said irregular protrusions serving as said micro-scatter structures.

4. The light-guide module as claimed in claim 3, wherein said micro-scatter structures configure said light-scatter zone with a light-scattering ability that increases from said first end to said second end.

5. The light-guide module as claimed in claim 4, wherein said light-scatter zone has a substantially non-varying width and a surface average roughness that increases from said first end to said second end.

6. The light-guide module as claimed in claim 4, wherein said light-scatter zone has a width that increases in a direction from said first end toward said second end, and said light-scatter zone has a surface average roughness that is not smaller than 3 μm and not larger than 6 μm.

7. The light-guide module as claimed in claim 6, wherein said width of said light-scatter zone is substantially non-varying within a predetermined distance from said second end.

8. The light-guide module as claimed in claim 7, wherein said surface average roughness is not smaller than 4 μm and not larger than 5 μm.

9. The light-guide module as claimed in claim 1, wherein each of said first and second working surfaces is disposed perpendicular to said light-exit surface.

10. The light-guide module as claimed in claim 1, wherein said light-scatter zone is rectangular.

11. A light-guide module comprising:
a light-guide strip having opposite first and second ends, a light-entry surface disposed at said first end, a light-exit surface extending between said first and second ends, and first and second working surfaces disposed parallel to each other and extending between said first and second ends, each of said first and second working surfaces being connected to said first end, said second end, and said light-exit surface, one of said first and second working surfaces defining a light-scatter zone and including a plurality of micro-scatter structures that are disposed within said light-scatter zone and that configure said light-scatter zone with a light-scattering ability that varies from said first end to said second end, each of said first and second working surfaces having an area greater than that of said light-exit surface; and
a reflecting element disposed to reflect light that exits from said light-guide strip via said first and second working surfaces back into said light-guide strip via said first and second working surfaces, respectively;

wherein said light-scatter zone satisfies the conditions of:

$Ra(0.5L)/Ra(0.1L) > 1.5$ $Ra(0.9L)/Ra(0.1L) > 1.5$ $0.4 < Ra(0.5L)/Ra(0.9L) < 2$ wherein L represents a length of said light-scatter zone from said first end to said second end, and Ra(0.1L), Ra(0.5L) and Ra(0.9L) represent roughness of said micro-scatter zone at distances of 10%, 50% and 90% of the length of said light-scatter zone from said first end toward said second end, respectively.

12. The light-guide module as claimed in claim 11, wherein said one of said first and second working surfaces is formed with a plurality of irregular protrusions within said light-scatter zone, said irregular protrusions serving as said micro-scatter structures.

13. The light-guide module as claimed in claim 12, wherein said irregular protrusions have a distribution density that increases toward said second end.

14. The light-guide module as claimed in claim 11, wherein each of said first and second working surfaces is disposed perpendicular to said light-exit surface.

15. The light-guide module as claimed in claim 11, wherein said micro-scatter structures configure said light-scatter zone with a light-scattering ability that increases from said first end toward said second end and that is stabilized adjacent to said second end.

16. The light-guide module as claimed in claim 15, wherein said light-scatter zone has a surface average roughness that increases from said first end toward said second end that is substantially non-varying adjacent to said second end.

17. The light-guide module as claimed in claim 11, wherein said light-entry surface is a polished surface, and said second end is a roughened surface.

18. The light-guide module as claimed in claim 11, wherein said light-guide strip further has a rear surface disposed opposite to said light-exit surface, and said reflecting element includes first, second and third reflecting portions disposed such that said first, second and third reflecting portion serve to reflect light that exits from said light-guide strip via said first and second working surfaces and said rear surface back into said light-guide strip via said first and second working surfaces and said rear surface, respectively.

19. The light-guide module as claimed in claim 11, further comprising:
a housing for receiving said light-guide strip and said reflecting element; and
a diffuser disposed corresponding to said light-exit surface and serving to scatter light that exits from said light-guide strip via said light-exit surface.

20. The light-guide module as claimed in claim 19, further comprising a light-extinguishing element disposed in said housing at said second end of said light-guide strip.

* * * * *